(12) United States Patent
Tojo et al.

(10) Patent No.: US 8,799,881 B2
(45) Date of Patent: Aug. 5, 2014

(54) PROGRAM PARALLELIZATION DEVICE AND PROGRAM PRODUCT

(75) Inventors: Nobuaki Tojo, Tachikawa (JP); Hidenori Matsuzaki, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 13/180,847

(22) Filed: Jul. 12, 2011

(65) Prior Publication Data

US 2012/0079467 A1    Mar. 29, 2012

(30) Foreign Application Priority Data

Sep. 27, 2010    (JP) ................................. 2010-215827

(51) Int. Cl.
*G06F 9/45*    (2006.01)

(52) U.S. Cl.
CPC .............. *G06F 8/4452* (2013.01); *G06F 8/452* (2013.01); *G06F 8/433* (2013.01); *G06F 8/443* (2013.01)
USPC ............ 717/150; 717/136; 717/149; 717/160

(58) Field of Classification Search
CPC ....... G06F 8/4452; G06F 8/452; G06F 8/433; G06F 8/443
See application file for complete search history.

(56) References Cited

U.S. PATENT DOCUMENTS

| | | | | |
|---|---|---|---|---|
| 6,539,541 | B1 * | 3/2003 | Geva .............................. | 717/150 |
| 7,555,745 | B2 * | 6/2009 | Iwashita ........................ | 717/137 |
| 7,805,413 | B2 * | 9/2010 | Hosoi ........................... | 707/693 |
| 8,127,280 | B2 * | 2/2012 | Thomas et al. ................ | 717/136 |
| 8,448,155 | B2 * | 5/2013 | Bordelon et al. ............. | 717/149 |
| 8,479,179 | B2 * | 7/2013 | Wu et al. ....................... | 717/150 |
| 2004/0003381 | A1 * | 1/2004 | Suzuki et al. ................. | 717/150 |
| 2004/0205738 | A1 * | 10/2004 | Yoshida et al. ............... | 717/150 |
| 2006/0010432 | A1 * | 1/2006 | Iwashita ....................... | 717/136 |
| 2006/0248520 | A1 * | 11/2006 | Kawabata et al. ............ | 717/160 |
| 2006/0277529 | A1 * | 12/2006 | Michimoto et al. .......... | 717/136 |

(Continued)

FOREIGN PATENT DOCUMENTS

| | | |
|---|---|---|
| JP | 11-120003 | 4/1999 |
| JP | 11-250035 | 9/1999 |
| JP | 2000-20482 | 1/2000 |
| JP | 2006-268070 | 10/2006 |

OTHER PUBLICATIONS

Yun-Woei Fann, An Intelligent Parallel Loop Scheduling for Parallelizing Compilers, 1999, pp. 170-191.*

(Continued)

*Primary Examiner* — Thuy Dao
*Assistant Examiner* — Mongbao Nguyen
(74) *Attorney, Agent, or Firm* — Nixon & Vanderhye, P.C.

(57) ABSTRACT

According to one embodiment, a parallelizing unit divides a loop into first and second processes based on a program to be converted and division information. The first and second processes respectively have termination control information, loop control information, and change information. The parallelizing unit inserts into the first process a determination process determining whether the second process is terminated at execution of an (n−1)th iteration of the second process when the second process is subsequent to the first process or determining whether the second process is terminated at execution of an nth iteration of the second process when the second process precedes the first process. The parallelizing unit inserts into the second process a control process controlling execution of the second process based on the result of determination notified by the determination process.

8 Claims, 17 Drawing Sheets

(56) References Cited

U.S. PATENT DOCUMENTS

| | | | |
|---|---|---|---|
| 2007/0169057 A1* | 7/2007 | Silvera et al. | 717/160 |
| 2007/0169059 A1* | 7/2007 | Halambi et al. | 717/160 |
| 2009/0055630 A1* | 2/2009 | Isshiki et al. | 712/216 |
| 2009/0113404 A1* | 4/2009 | Takayama et al. | 717/149 |
| 2010/0333108 A1* | 12/2010 | Cypher | 718/106 |
| 2011/0067015 A1* | 3/2011 | Takagi et al. | 717/149 |
| 2011/0088020 A1* | 4/2011 | Eichenberger et al. | 717/149 |

OTHER PUBLICATIONS

Martin Griebl, Automatic Parallelization of Loop Programs for Distributed Memory Architectures, 2004, pp. 1-42.*

Saisanthosh Balakrishnan, Program Demultiplexing: Data-Flow Based Speculative Parallelization of Methods in Sequential Programs, 2007, pp. 1-19.*

Office Action dated Aug. 7, 2012 in Japanese Application No. 2010-215827 with English-language translation.

* cited by examiner

FIG.5

```
501
01:int foo(){
02: int total=0;
03: int temp[100];
04: int i;
05: temp[0]=0;
06: for(i=1;i<100;i++){
07:  temp[i]=func_1(temp[i-1]);
08:  total+=func_2(temp[i]);
09:  if(total>1000){
10:   break;
11:  }
12: }
13: return total;
14:}
```

FIG.6A

```
601
7:thread_1
8:thread_2
9-11:thread_3
```

FIG.6B

```
602
End:thread_3
```

FIG.6C

```
603
Effect:thread_2
```

FIG.6D

```
604
thread_1:temp[i]->thread_2:temp[i]
thread_2:total->thread_3:total
```

FIG.7A

```
701
01:int foo(){
02: int total=0;
03: int temp=0;
04: while(total>100){
05:  temp=func_1(temp);
06:  total+=func_2(temp);
07: }
08: return total;
09:}
```

FIG.7B

```
702
01:int foo(){
02: int total=0;
03: int temp=0;
04: for(;;){
05:  if(total>100){
06:   break;
07:  }
08:  temp=func_1(temp);
09:  total+=func_2(temp);
10: }
11: return total;
12:}
```

FIG.7C

```
703
4:End:loop
```

FIG.8A

```
801
01:int foo(){
02: int total=0;
03: int i, temp;
04: try {
05:  for(i=0;i<100;i++){
06:   temp=func_1(i);
07:   total+=func_2(temp);
08:  }
09: }
10: catch{
11:  total=0;
12: }
13: return total;
14:}
```

FIG.8B

```
802
01:int foo(){
02: int total=0;
03: int i, temp;
04: for(i=0;i<100;i++){
05:  try{
06:   temp=func_1(i);
07:  }
08:  catch{
09:   total=0;
10:   goto end_loop;
11:  }
12:  try{
13:   total+=func_2(temp);
14:  }
15:  catch{
16:   total=0;
17:   goto end_loop;
18:  }
19: }
20: end_loop:
21: return total;
22:}
```

FIG.8C

```
803
End:exception
```

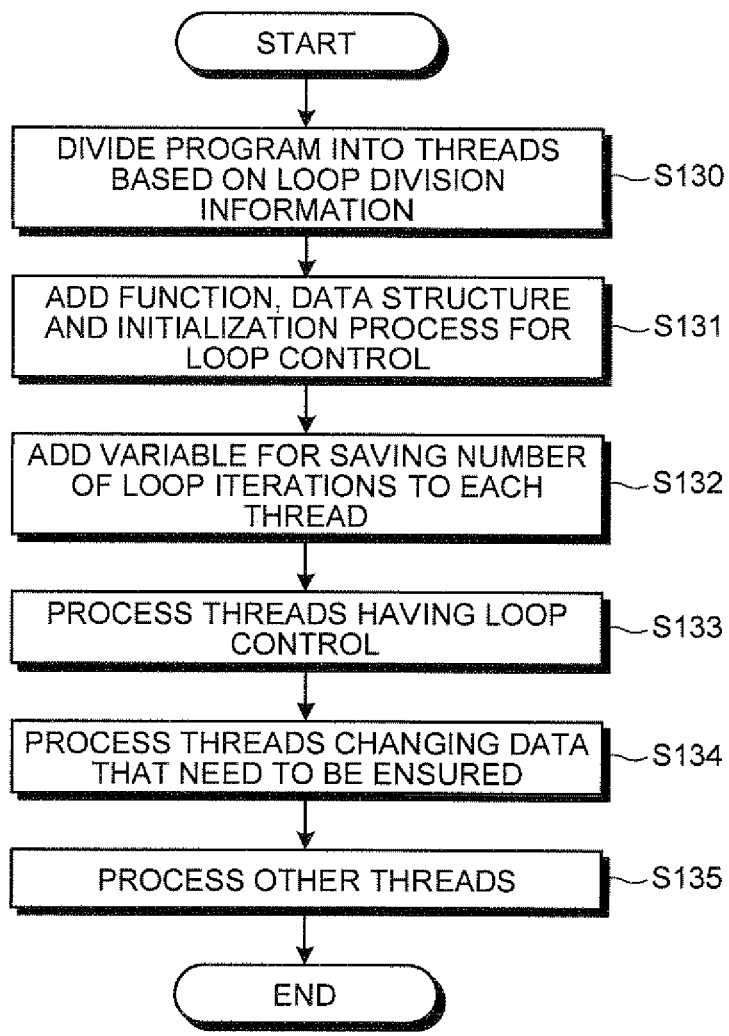

FIG.10

```
01:int foo(){
02: int total=0;
03: int temp[100];
04: int i;
05: temp[0]=0;
06: reset_cancel_state();
07: fork(thread_1);
08: fork(thread_2);
09: fork(thread_3);
10: join(thread_1);
11: join(thread_2);
12: join(thread_3);
13: return total;
14:}
15:
16:void thread_1(){
17: int count=0;
18: for(i=1;i<100;i++){
19:   temp[i]=func_1(temp[i-1]);
20:   if(check_cancel_state(count,0,0)==1){
21:     break;
22:   }
23:   count++;
24: }
25:}
26:
27:void thread_2(){
28: int count=0;
29: for(i=1;i<100;i++){
30:   total+=func_2(temp[i]);
31:   if(check_cancel_state(count,1,0)==1){
32:     break;
33:   }
34:   count++;
35: }
36:}
37:
38:void thread_3()
39: for(i=1;i<100;i++)}
40:   if(total>100){
41:     update_cancel_state(1,0);
42:     break;
43:   }
44:   update_cancel_state(0,0);
45: }
46:}
```

FIG.11

```
01:struct cancel_state{
02: char canceled;
03: unsigned long count;
04:};
05:
06:struct cancel_state cancel[NUM_CONT_STAT];
07:
08:void reset_cancel_state(){
09: for(i=0;i<NUM_CONT_STAT;i++){
10:   cancel[i].canceled=0;
11:   cancel[i].count=0;
12: }
13:}
14:
15:void update_cancel_state(char canceled,int cancel_ID){
16: cancel[cancel_ID].canceled=canceled;
17: if(canceled==0){
18:   cancel[cancel_ID].count++;
19: }
20:}
21:
22:char check_cancel_state(unsigned long count,char effect,int cancel_ID){
23: if(effect==1){
24:   while(count<cancel[cancel_ID].count){
25:     wait();
26:   }
27:   if(cancel[cancel_ID].canceled==1)
28:     return1;
29: }else if((count<cancel[cancel_ID].count)&&(cancel[cancel_ID].canceled==1)){
30:   return1;
31: }
32: }
33: return0;
34:}
```

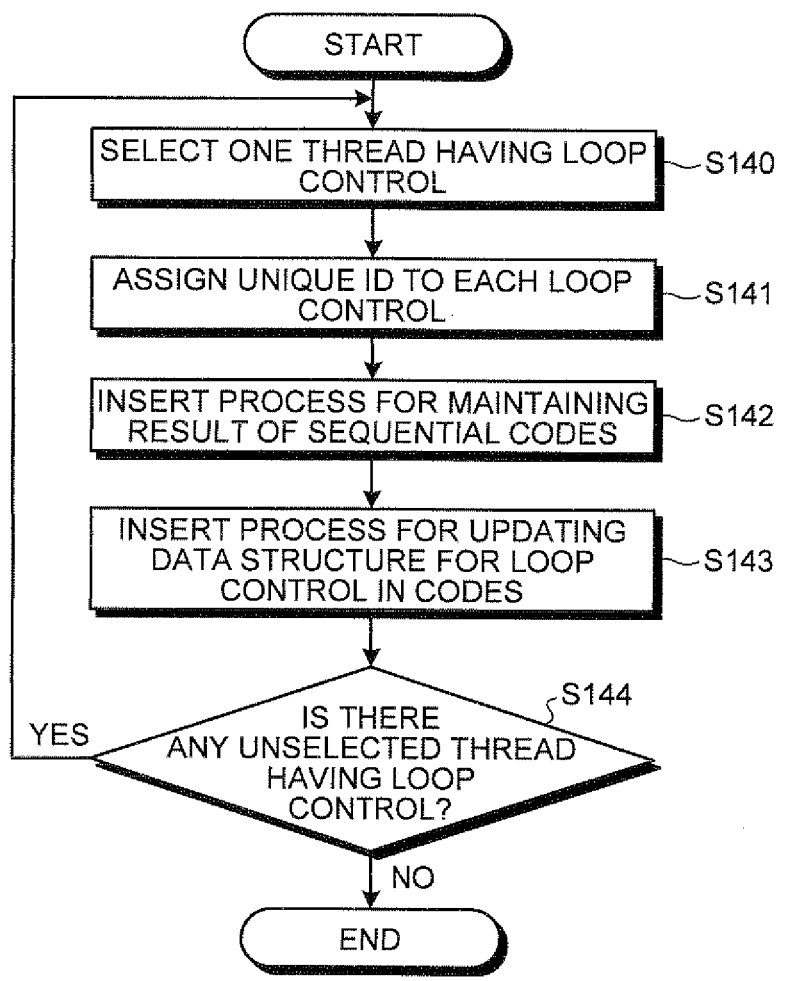

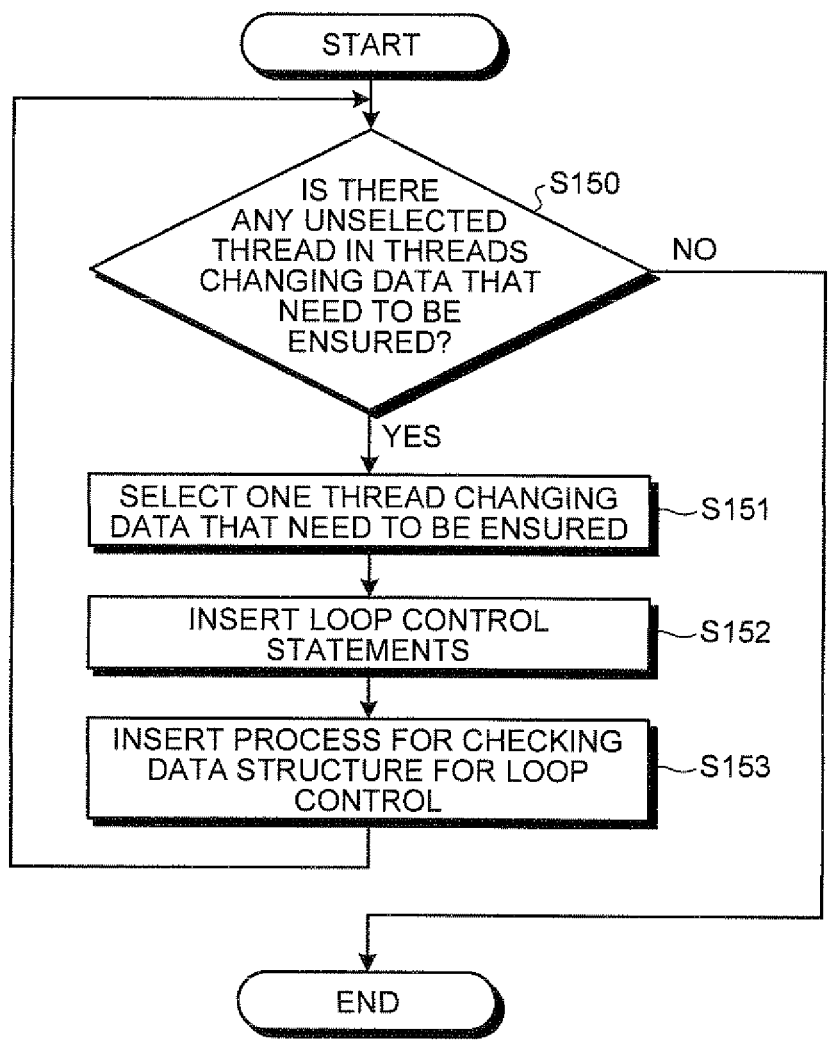

FIG.15A

```
                                          1501
01: int foo(){
02:   int total=0;
03:   int temp[100];
04:   int i;
05:   temp[0]=0;
06:   for(i=1;i<100;i++){
07:     temp[i]=func_1(temp[i-1]);
08:     total+=func_2(temp[i]);
09:     if(total>1000){
10:       return 0;
11:     }
12:   }
13:   return total;
14: }
```

FIG.15B

```
                                          1502
01: int foo(){
02:   int total=0;
03:   int temp[100];
04:   int i;
05:   temp[0]=0;
06:   reset_cancel_state(cancel);
07:   fork(thread_1);
08:   fork(thread_2);
09:   fork(thread_3);
10:   join(thread_1);
11:   join(thread_2);
12:   join(thread_3);
13:   if(cancel[0].canceled==1){
14:     return 0;
15:   }
16:   return total;
17: }
18:
19: void thread_1(){
20:   int count=0;
21:   for(i=1;i<100;i++){
22:     temp[i]=func_1(temp[i-1]);
23:     if(check_cancel_state(count,0,0)==1){
24:       goto loop_end;
25:     }
26:     count++;
27:   }
28: loop_end:
29: }
30:
31: void thread_2(){
32:   int count=0;
33:   for(i=1;i<100;i++){
34:     total+=func_2(temp[i]);
35:     if(check_cancel_state(count,1,0)==1){
36:       goto loop_end;
37:     }
38:     count++;
39:   }
40: loop_end:
41: }
42:
43: void thread_3(){
44:   for(i=1;i<100;i++){
45:     if(total>100){
46:       update_cancel_state(1,0);
47:       goto loop_end;
48:     }
49:     update_cancel_state(0,0);
50:   }
51: loop_end:
52: }
```

FIG.16A

```
01:int foo(){
02: int total=0;
03: int temp[100];
04: int i;
05: temp[0]=0;
06: for(i=1;i<100;i++){
07:  temp[i]=func_1(temp[i-1]);
08:  total+=func_2(temp[i]);
09:  if(total>1000){
10:   goto label_1;
11:  }
12: }
13: return total;
14:label_1:
15: return 0;
16:}
```

FIG.16B

```
01:int foo(){
02: int total=0;
03: int temp[100];
04: int i;
05: temp[0]=0;
06: reset_cancel_state(cancel);
07: fork(thread_1);
08: fork(thread_2);
09: fork(thread_3);
10: join(thread_1);
11: join(thread_2);
12: join(thread_3);
13: if(cancel[0].canceled==1)goto label_1;
14: return total;
15:label_1:
16: return 0;
17:}
18:
19:void thread_1(){
20: int count=0;
21: for(i=1;i<100;i++){
22:  temp[i]=func_1(temp[i-1]);
23: if(check_cancel_state(count,0,0)==1){
24:   goto loop_end;
25:  }
26:  count++;
27: }
28:loop_end:
29:}
30:
31:void thread_2(){
32: int count=0;
33: for(i=1;i<100;i++){
34:  total+=func_2(temp[i]);
35:  if(check_cancel_state(count,1,0)==1){
36:   goto loop_end;
37:  }
38:  count++;
39: }
40:loop_end:
41:}
42:
43:void thread_3(){
44: for(i=1;i<100;i++){
45:  if(total>100){
46:   update_cancel_state(1,0);
47:   goto loop_end;
48:  }
49:  update_cancel_state(0,0);
50: }
51:loop_end:
52:}
```

FIG.17A

```
01: int foo(){
02:   int total=0;
03:   int temp[100];
04:   int i;
05:   temp[0]=0;
06:   for(i=1;i<100;i++){
07:     if(total%i==0){
08:       continue;
09:     }
10:     temp=func_1(temp[i-1]);
11:     total+=func_2(temp[i])
12:   }
13:   return total;
14: }
```

FIG.17B

```
                                                    ⌐1702
01: int foo(){
02:  int total=0;
03:  int temp[100];
04:  int i;
05:  temp[0]=0;
06:  reset_cancel_state(cancel);
07:  fork(thread_1);
08:  fork(thread_2);
09:  fork(thread_3);
10:  join(thread_1);
11:  join(thread_2);
12:  join(thread_3);
13:  return total;
14: }
15:
16: void thread_1(){
17:  for(i=1;i<100;i++){
18:   if(total%i==0){
19:    update_cancel_state(1,0);
20:    continue;
21:   }
22:   update_cancel_state(0,0);
23:  }
24: }
25:
26: void thread_2(){
27:  for(i=1;i<100;i++){
28:   temp[i]=func_1(temp[i-1]);
29:  }
30: }
31:
32: void thread_3()
33:  int count=0;
34:  for(i=1;i<100;i++){
35:   if(check_cancel_state(count,1,0)==1){
36:    continue;
37:   }
38:   count++;
39:   total+=func_2(temp[i]);
40:  }
41: }
```

FIG.18

```
01:int foo(){
02: int total=0;
03: int temp[100];
04: int i;
05: temp[0]=0;
06: reset_cancel_state();
07: fork(thread_1);
08: fork(thread_2);
09: fork(thread_3);
10: join(thread_1);
11: join(thread_2);
12: join(thread_3);
13: return total;
14:}
15:
16:void thread_1(){
17: int count=0;
18: for(i=1;i<100;i++){
19:  temp[i]=func_1(temp[i-1]);
20:  PUT(thread_2[i],temp[i]);
21:  if(check_cancel_state(count,0,0)==1){
22:   break;
23:  }
24:  count++;
25: }
26:}
27:
28:void thread_2(){
29: int count=0;
30: for(i=1;i<100;i++){
31:  GET(thread_1[i],temp[i]);
32:  total+=func_2(temp[i]);
33:  PUT(thread_3[i],total);
34:  if(check_cancel_state(count,1,0)==1){
35:   break;
36:  }
37:  count++;
38: }
39:}
40:
41:void thread_3(){
42: for(i=1;i<100;i++){
43:  GET(thread_2[i],total);
44:  if(total>100){
45:   update_cancel_state(1,0);
46:   break;
47:  }
48:  update_cancel_state(0,0);
49: }
50:}
```
— 1801

US 8,799,881 B2

PROGRAM PARALLELIZATION DEVICE AND PROGRAM PRODUCT

CROSS-REFERENCE TO RELATED APPLICATIONS

This application is based upon and claims the benefit of priority from Japanese Patent Application No. 2010-215827, filed on Sep. 27, 2010; the entire contents of which are incorporated herein by reference.

FIELD

Embodiments described herein relate generally to a program parallelization device and a program product.

BACKGROUND

There are known technologies for parallelizing a program, which is for a sequential computer (hereinafter referred to as a sequential program), so that the program can be processed in parallel by a plurality of cores or processors. In the parallelization of a sequential program, a loop in the program that occupies much time of computation time is typically parallelized. There have conventionally been various techniques developed for parallelization of loops, but there still are some loops that are difficult to parallelize. One example of such loops which are difficult to parallelize is a loop whose number of iterations is not known before being executed.

In a conventional technology for parallelizing a program including a loop whose number of iterations is not known before being executed, data values to be used after termination of the loop are ensured using a technique called rollback to perform parallelization. According to this technology, data values are ensured by saving data to be used after termination of the loop at execution of each thread and restoring the saved data when the loop is terminated. Thus, a situation can be avoided in which the result of executing a parallelized version of a sequential program is different from the result of executing the sequential program.

For rollback, however, it is necessary to reserve a memory area for saving the data to be used after termination of the loop, and this waste the memory capacity. In addition, according to a conventional rollback technology, operations such as saving necessary data, detecting loop termination, notifying other threads, reading out an appropriate value from saved data and replacing data is required. As a result, complex control is required.

BRIEF DESCRIPTION OF THE DRAWINGS

FIG. 5 shows an example of a sequential program;

FIGS. 6A to 6D show examples of information other than the sequential program in relation to a program analyzing unit;

FIGS. 7A to 7C show examples of description of a loop control statement as conditional statements of a loop;

FIGS. 8A to 8C show examples of description of an exception handling including the entire loop;

FIG. 9 is an example flowchart illustrating the loop parallelization process in more detail;

FIG. 10 shows examples of codes constituting an intermediate parallelized program;

FIG. 11 is a diagram explaining examples of a data structure and functions to be used for loop control;

FIG. 12 is a flowchart illustrating an example of processing on a thread having a loop control statement;

FIG. 13 is a flowchart illustrating processing on a thread that changes data to be referred to in a process subsequent to a loop;

FIGS. 15A and 15B are diagrams that indicate explaining examples of codes conversion of a sequential program in which "return" is a loop control;

FIGS. 16A and 16B are diagrams that indicate explaining examples of codes conversion of a sequential program in which "goto" is a loop control;

FIGS. 17A and 17B is a diagram that indicate explaining examples of codes conversion of a sequential program in which "continue" is a loop control;

FIG. 18 shows an example of codes constituting a parallelized program including a process for ensuring data dependencies;

DETAILED DESCRIPTION

In general, a program parallelization device according to one embodiment includes an input unit and a loop parallelizing unit. The input unit inputs a sequential program to be converted that includes a loop, loop division information indicating that a process within the loop is to be divided into a first process and a second process, loop control information indicating that at least one of the first process and the second process includes a loop control statement of the loop, and change information indicating that at least one of the first process and the second process executes a change statement that changes data to be referred to in a process subsequent to the loop. The loop parallelizing unit divides the loop into the first process and the second process according to the loop division information and create a parallelized program, which is to run on a computer having plural cores or processors or on plural computers, from the first process and the second process obtained by dividing the loop. The loop control information indicates that the first process includes the loop control statement, and the change information indicates that the second process includes the change statement. The loop parallelizing unit inserts a determination process into the first process, the determination process determining whether or not the second process is terminated at execution of an (n−1)th loop iteration (n is an integer of 2 or more) when the second process is subsequent to the first process in the program to be converted, or determining whether or not the second process is terminated at execution of an nth loop iteration when the second process precedes the first process in the program to be converted, and notifying the second process of a result of the determination. The loop parallelizing unit inserts a control process into the second process, the control process controlling execution of the second process based on the result of determination notified by the determination process.

Figure 1:
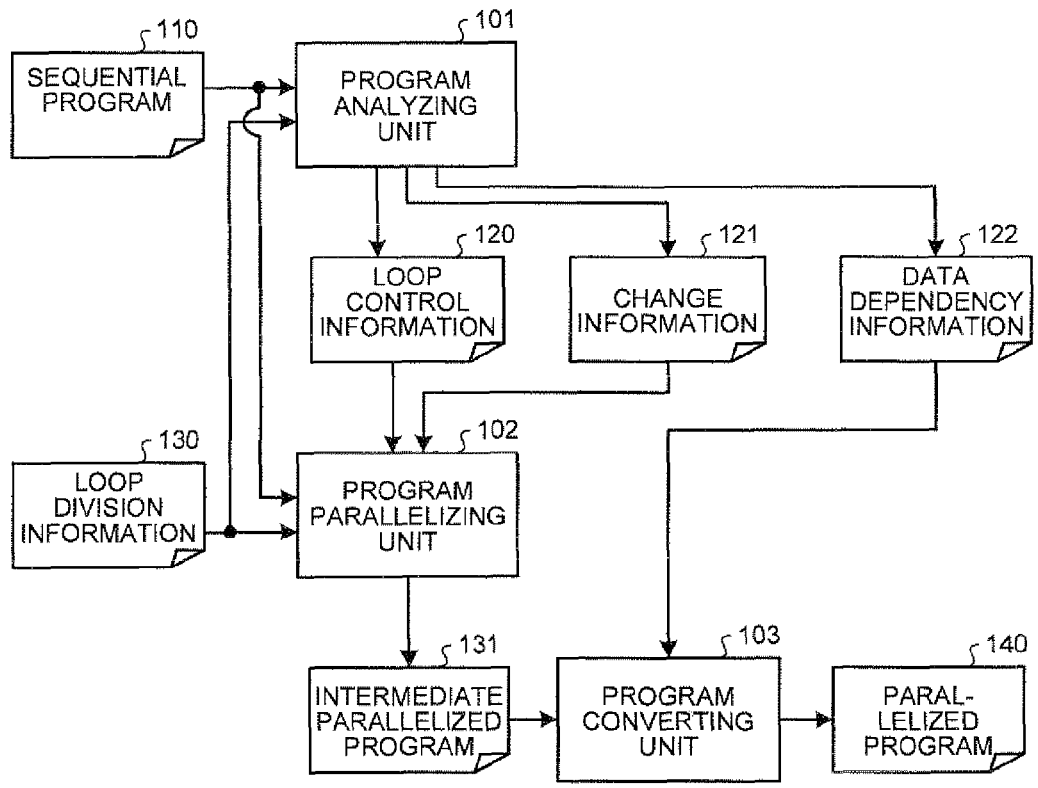
FIG. 1 is a functional block diagram of a system including a program parallelization device of an embodiment.

FIG. 1 is an example of functional block diagram explaining functions of a program parallelization system including a program parallelization device according to an embodiment. The program parallelization system includes a program analyzing unit 101, a program parallelizing unit 102 corresponding to the program parallelization device, and a program converting unit 103. The program analyzing unit 101 analyzes a sequential program 110 input thereto and outputs loop control information 120, change information 121 and data dependency information 122 as analysis results. The sequential program 110 is a program described in such a manner that instructions can be executed sequentially on one time series.

Although it is explained herein that the program parallelization device corresponds to the program parallelizing unit 102, the program parallelization device is not limited to this example. For example, the program parallelization device may include the program converting unit 103 in addition to the program parallelizing unit 102. Alternatively, the program parallelization device may include the program analyzing unit 101, the program parallelizing unit 102 and the program converting unit 103.

Figure 2:
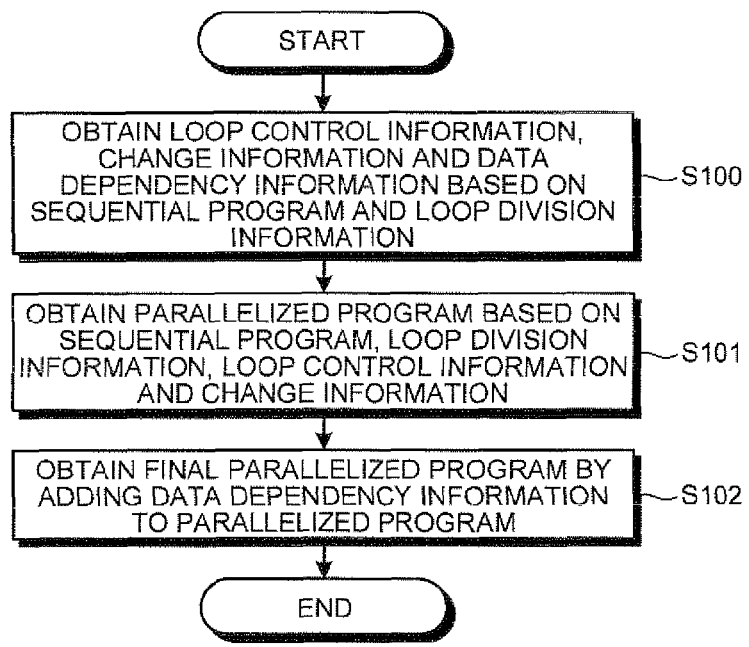
FIG. 2 is a flowchart schematically illustrating an example of a program parallelization process.

FIG. 2 is a flowchart schematically illustrating an example of a program parallelization process performed by the program parallelization system of FIG. 1. Before performing the process of FIG. 2 flowchart, the sequential program 110 to be converted to a parallelized program and loop division information 130 are input from outside of the program parallelization system, for example. The loop division information 130 indicates the way how a loop included in the sequential program 110 will be divided into units of processing.

First, in step S100, the program analyzing unit 101 analyzes the sequential program 110 based on the input sequential program 110 and the input loop division information 130, and outputs the loop control information 120, the change information 121 and the data dependency information 122. The loop control information 120 indicates what process in the program terminates the loop and in what way. The change information 121 indicates what statement in the program changes the data to be used after the loop is terminated. The data dependency information 122 indicates a dependency of data to be used in a plurality of processes resulting from dividing a process.

Next, in step S101, the program parallelizing unit 102 performs a parallelization process on the sequential program 110 based on the loop control information 120 and the change information 121 output from the program analyzing unit 101 in step S100 as well as on the input sequential program 110 and the input loop division information 130, and outputs an intermediate parallelized program 131.

Next, in step S102, the program converting unit 103 generates a final parallelized program 140, in which data dependencies are ensured, based on the intermediate parallelized program 131 output in step S101 and on the data dependency information 122 output from the program analyzing unit 101 in step S100, and outputs the generated parallelized program 140.

Figure 3:
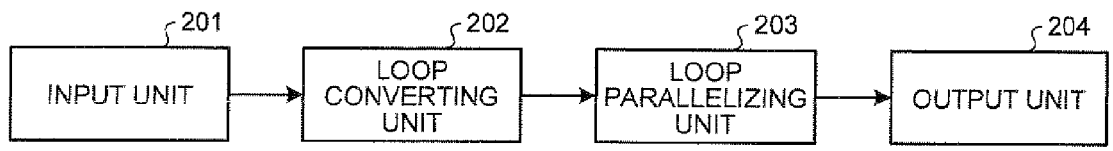
FIG. 3 is an example functional block diagram illustrating functions of a program parallelizing unit.

FIG. 3 is an example functional block diagram illustrating functions of the program parallelizing unit 102. The program parallelizing unit 102 includes an input unit 201, a loop converting unit 202, a loop parallelizing unit 203 and an output unit 204.

Figure 4:
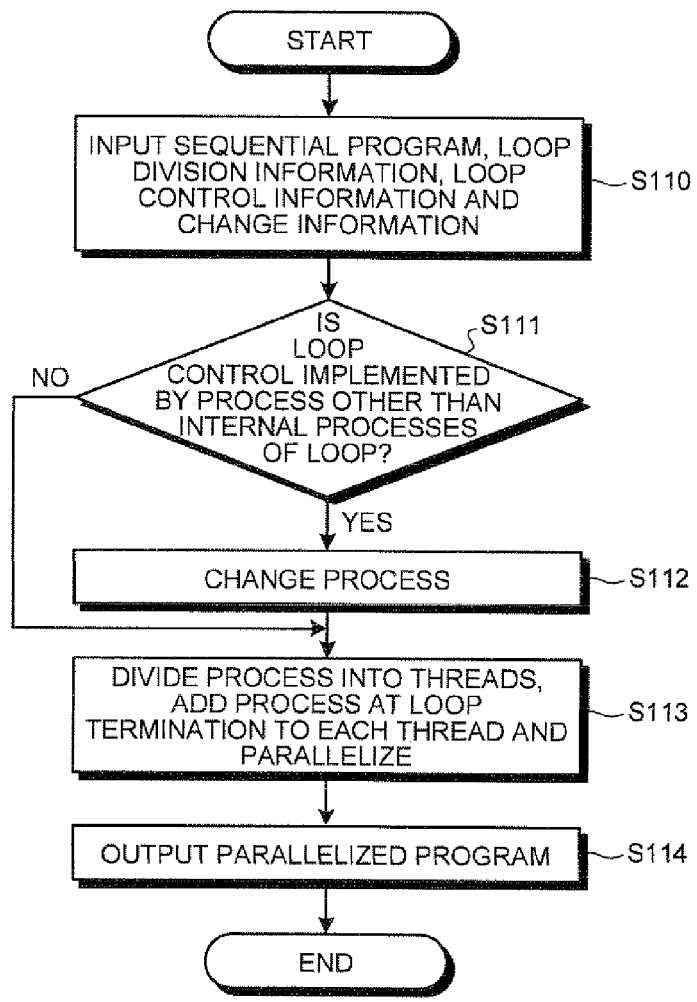
FIG. 4 is an example flowchart illustrating the program parallelization process.

FIG. 4 is an example flowchart illustrating the program parallelization process performed by the program parallelizing unit 102. First, in step S110, the input unit 201 inputs the sequential program 110, the loop division information 130, the loop control information 120 and the change information 121. Next, in step S111, the loop converting unit 202 determines whether or not the loop control is implemented by a process other than internal processes of the loop based on the loop control information 120. As a result, the loop converting unit 202 converts only the loop, for which the loop control is implemented by a process other than internal processes of the loop, so that the loop control is performed by an internal process of the loop in step S112, and the processing proceeds to step S113. If it is determined that the loop control is performed by an internal process of the loop, the processing proceeds to step S113 without any change.

In step S113, the loop parallelizing unit 203 divides the loop of the sequential program 110 into processes according to the loop division information 130, and converts the divided processes into a form that can be executed in parallel. For example, the processes are converted into threads that can be executed by respective cores of a multicore processor. The form into which the processes are converted are not limited thereto, and may be a parallelized form provided uniquely for an environment in which the parallelized program 140 is run. The loop parallelizing unit 203 also adds a process at loop termination to the processes obtained by dividing the loop based on the information input to the input unit 201 in step S110 to generate the intermediate parallelized program 131. Next, in step S114, the output unit 204 outputs the intermediate parallelized program 131.

Next, the program parallelization process according to the embodiment will be described in more detail referring to typical source codes. In the following, an example in which the program parallelization system has the above-described configuration illustrated in FIG. 1 and the program parallelizing unit 102 in the program parallelization system has the above-described configuration illustrated in FIG. 3 will be described.

It should be noted that the embodiment is not limited to this example, and may have a configuration in which the functional blocks illustrated in FIGS. 1 and 3 operate while cooperating with one another, or may have a configuration in which some functional blocks are arranged in a different order, for example. Alternatively, some functional blocks may be divided into other functional blocks in the configurations illustrated in FIGS. 1 and 3. Further, the program parallelization system may be configured by a combination of these three configurations. Still further, the program parallelization system may be configured in a manner that one or more of the functional blocks illustrated in FIGS. 1 and 3 are divided into a plurality of modules.

First, the program analyzing unit 101 will be described. With reference to FIG. 1, the program analyzing unit 101 analyzes the sequential program 110 based on the sequential program 110 and the loop division information 130 and outputs the loop control information 120, the change information 121 and the data dependency information 122 as already described above. The sequential program 110 is described using a programming language such as the C language or the Java (registered trademark) language, for example. The sequential program 110 is not limited thereto, and may be described using a programming language specific to a certain processing device. The sequential program 110 may be provided in a manner that all source codes are stored in one file or in a manner that source codes are stored separately in a plurality of files.

FIG. 5 shows an example of the sequential program 110. Although only the part of source codes which are modified by the program parallelization system are shown in FIG. 5 in this example, whole source codes necessary for making an application run may be input to the program analyzing unit 101. If more source codes are input, the time for analysis will be longer, but the accuracy of analysis such as a data dependency is improved.

In FIG. 5 and subsequent figures similarly showing examples of programs, first two digits of numbers on each line represent a line number for the sake of explanation unless otherwise particularly stated, and each line number is distinguished from the source code itself by a colon that follows. In addition, programs and codes raised as examples in the embodiment are pseudo-codes described in accordance with the notation of the C language that is commonly used as a programming language.

In codes 501 in the sequential program 110 in the example of FIG. 5, lines 6 to 12 constitute a loop using a for statement. In the loop, a functional process using a loop variable i is performed on line 7, and a functional process based on the result of line 7 is performed on line 8. Further, a determination process based on the result of line 8 is performed on line 9, and a loop control statement of the loop based on the determination result is performed on line 10. On line 13 outside of the loop, a return value to return to another function is shown.

FIGS. 6A to 6D show examples of the information other than the sequential program 110 in relation to the program analyzing unit 101. FIG. 6A shows an example of the loop division information 130. FIGS. 6B and 6C show examples of the loop control information 120 and the change information 121, respectively. FIG. 60 shows an example of the data dependency information 122.

The loop division information 130 is illustrated as being described directly by a user using a text editor or the like and input to the program parallelizing unit 102 in FIG. 1, but the loop division information 130 is not limited to this example. For example, the program analyzing unit 101 may analyze the sequential program 110 to search for a loop suitable for parallelization, determine a dividing method that can easily parallelize the loop, and output corresponding loop division information 130. Further, the program analyzing unit 101 may present the loop division information 130 to the user through a graphic user interface (GUI) or the like and output the information that is confirmed or modified by the user. A method for outputting the loop division information 130 from source codes of the sequential program 110 can be achieved by applying an existing technology for parsing and analyzing a program using a compiler or the like.

The loop control information 120, the change information 121 and the data dependency information 122 are illustrated as being obtained by analyzing the sequential program 110 and output by the program analyzing unit 101 in FIG. 1. A method for outputting the loop control information 120, the change information 121 and the data dependency information 122 from the source codes of the sequential program 110 can be achieved by applying an existing technology for parsing and analyzing a program using a compiler or the like.

To generate the loop control information 120, the change information 121 and the data dependency information 122, one or more of these information data may be described directly by the user using a text editor or the like and input to the program parallelizing unit 102, for example. Alternatively, the program analyzing unit 101 may present the loop control information 120, the change information 121 and the data dependency information 122 to the user through a GUI or the like and output the information data that are confirmed or modified by the user.

The loop division information 130, the loop control information 120, the change information 121 and the data dependency information 122 may be created by any method as long as the information data include information necessary in the program parallelizing unit 102 and the program converting unit 103. For example, the information data may be information created by a program analyzing unit 101 for another device, such as a parallelizing compiler, or by another device that is modified to be the program parallelizing unit 102 according to the embodiment. Further, the loop control information 120, the change information 121 and the data dependency information 122 generated by the program analyzing unit 101 may be modified by the user using a text editor or the like and input to the program parallelizing unit 102. The loop division information 130, the loop control information 120, the change information 121 and the data dependency information 122 may be in a form of binary data or intermediate data defined uniquely for the program parallelization system or another device instead of text data.

Moreover, the loop division information 130, the loop control information 120, the change information 121 and the data dependency information 122 may be provided in a state stored in separate files or may be provided in a state stored collectively in one or more files. Alternatively, the loop division information 130, the loop control information 120, the change information 121 and the data dependency information 122 may be provided in a state stored in a mixed manner in files.

The loop division information 130 will be described. The loop division information 130 includes information for dividing internal processes of a loop to be parallelized in the sequential program 110 into units of processing suitable for parallelization. In the example of FIG. 6A, the description "7:thread_1" on line 1 of information 601 indicates that line 7 of the codes 501 of the sequential program 110 is divided to be a process called "thread_1", the description "8:thread_2" on line 2 indicates that line 8 of the codes 501 is divided to be a process called "thread_2", and the description "9-11: thread_3" on line 3 indicates that lines 9 to 11 of the codes 501 is divided to be a process called "thread_3".

While the program within a single file is specified by the line number in this example, the manner in which a program is specified is not limited thereto. A file name of the program may be described before the line number so as to specify the program in a plurality of files. Furthermore, a part to be divided in the sequential program 110 may be directly specified, or the specified part may be labeled and specified using the label in the loop division information 130. Thus, any syntactic grammar may be used for the loop division information 130 as long as the way the internal processes of the loop to be parallelized are divided can be specified.

In the following, a thread that executes a process called "thread_1" is referred to as thread_1, a thread that executes a process called "thread_2" is referred to as thread_2, and a thread that executes a process called "thread_3" is referred to as thread_3, as appropriate.

The loop control information 120 will be described. The loop control information 120 specifies a process that executes loop control statement among processes obtained, by dividing the loop according to the loop division information 130. In the example of FIG. 6B, the description "End:thread_3" of information 602 indicates that the loop control statement is executed in the process "thread_3" in the loop division information 130 shown in FIG. 6A.

There may be a plurality of loop control statements in one process. For example, if there are two loop control statements in the process "thread_3", the syntaxes can be described as "End:thread_3:2". In this example, the process that executes a loop control statement is specified by using the process name set by the loop division information 130, but the manner in which the process is specified is not limited thereto. The process that executes a loop control statement may be specified by specifying a loop control code using the line number in the program similarly to the loop division information 130 and combining the specified loop control code with information in the loop division information 130 at the program parallelizing unit 102. Alternatively, the loop control code may be directly specified in the sequential program 110, or the specified part may be labeled and specified using the label and the number of loop control statements in the loop control information 120. In this example, one thread is specified by the loop control information 120, but more than one thread may be specified. Thus, any syntactic grammar may be used for the loop control information 120 as long as the number of parts executing the loop control and the processes executing the parts can be specified.

The change information 121 will be described. The change information 121 specifies a statement that changes data to be used after termination of the loop among the processes obtained by dividing the loop according to the loop division information 130. In the example of FIG. 6C, the description "Effect:thread_2" of information 603 indicates that a statement that changes data to be used after termination of the loop is executed in the process "thread_2" of the loop division information 130 shown in FIG. 6A.

In this example, the change statement is specified by using the process name set by the loop division information 130, but the manner in which the statement is specified is not limited thereto. The statement that changes data to be used after termination of the loop may be specified by specifying a change code of data to be used after termination of the loop using the line number in the program similarly to the loop division information 130 and combining the specified change code with information in the loop division information 130 at the program parallelizing unit 102. Alternatively, the change code may be directly specified in the sequential program 110, or the specified part may be labeled and specified using the label in the change information 121. Thus, any syntactic grammar may be used for the change information 121 as long as the process executing the part of the change statement can be specified.

In the example of the information 603 of FIG. 6C, the process that changes data to be used after termination of the loop is specified. Alternatively, a process that does not change data to be used after termination of the loop may be specified as, for example, the description "Noeffect:thread_1" instead of specifying a process that changes data.

The data dependency information 122 will be described. The data dependency information 122 provides information on dependencies of data to be used in a plurality of processes obtained by dividing a loop based on the loop division information 130. In the example of FIG. 6C, the description "thread_2:total->thread_3:total" of information 604 indicates that there is a data dependency from a variable "total", which is to be changed in the process "thread_2", to data "total", which is to be used in the process "thread_3" having the same iteration in the loop division information 130.

In the example described above, there is a data dependency between threads having the same iteration. However, a data dependency can be set between threads having different iterations. For example, if the variable "total" of thread_2 at the [i]th iteration is used as the variable "total" of thread_3 at the next ([i+1]th) iteration, the data dependency can be implemented by describing the data dependency information 122 as "thread_2[0]:total->thread_3[1]:total" or the like.

While the data dependency information is specified using the variable name in the sequential program 110 in this example, the manner in which the data dependency information is specified is not limited thereto. A process that changes data to be used after termination of the loop may be specified by specifying a data dependency code using the line number in the program similarly to the loop division information 130 and combining the specified data dependency information with information in the loop division information 130 at the program parallelizing unit 102. Alternatively, the data dependency code may be directly specified in the sequential program 110, or the specified part may be labeled and specified using the label in the data dependency information 122. Thus, any syntactic grammar may be used for the data dependency information 122 as long as the part executing the data dependency process can be specified.

Next, functions of the program parallelizing unit 102 will be described referring to the functional block diagrams of FIGS. 1 and 3 and the flowchart of FIG. 4. The program parallelizing unit 102 parallelizes the sequential program 110 based on the sequential program 110, the loop division information 130, the loop control information 120 and the change information 121, and outputs the intermediate parallelized program 131 as described above. First, in step S110 of FIG. 4, the sequential program 110, the loop division information 130, the loop control information 120 and the change information 121 are input to the input unit 201 and supplied to the loop converting unit 202.

It is assumed here that the sequential program 110 to be parallelized includes a loop whose number of iterations is not known before being executed. A loop means a part where the same statements are repeatedly executed in a program compiled in a certain manner into a machine language for a computer to run the program. For example, in the C language or the Java (registered trademark) language, loop processes can be described using a for statement, a while statement and the like. Alternatively, loop processes may also be described using recursive function calls. Alternatively, the loop processes may be directly described using a machine language.

If the number of iterations of the loop processes is not a predetermined number but varies depending on entries to the program or execution environment, the number of iterations of the loop cannot be known in advance. The present program parallelization system is configured to parallelize such a loop whose number of iterations is not known before execution of the program. If a loop that does not meet such a condition is to be parallelized, the program parallelizing unit 102 only performs processing for dividing the loop into a form that can be parallelized. The number of loops to be parallelized is not always one in the sequential program 110, but there may be more than one loop to be parallelized. In addition, one or more loops may be present within a loop to be parallelized, and the loops therein may also be loops to be parallelized. In such case, loops that meet the above condition and loops that do not meet the above condition may be mixed.

A method using a file system that is commonly used may be employed as a method for inputting the sequential program 110 and the information data to the input unit 201. For example, the sequential program 110 and the information data are stored in a storage medium such as a flexible disk, an optical disk, a hard disk drive or a nonvolatile semiconductor memory insertable/removable to/from a device, and the input unit 201 reads the sequential program 110 and the information data from the storage medium.

Alternatively, the sequential program 110 and the information data may be read in advance by a memory via a network or the like, and the sequential program 110 and the information data may be input from the memory to the input unit 201. Still alternatively, the sequential program 110 and the information data may be combined in advance with source codes and profile information for implementing the program parallelizing unit 102, for example. Further, the sequential program 110 and the information data may be input directly by the user to the input unit 201 through a GUI or the like. Still further, the program analyzing unit 101 and the program parallelizing unit 102 may constitute one system, and information may be passed from the program analyzing unit 101 directly to the program parallelizing unit 102 using certain communication means.

Next, in steps S111 and S112 of FIG. 4, the loop converting unit 202 converts the loop to be parallelized included in the sequential program 110 into a form suitable for parallelization based on the sequential program 110 and the loop division information 130 input to the input unit 201. A method for searching source codes of the sequential program 110 for a loop to be parallelized can be achieved by applying an existing technology for parsing a program using a compiler or the like. Alternatively, the user may specify a loop to be parallelized in the sequential program 110, or information on specification of a loop to be parallelized, in a form of loop division information 130, may be input to the program analyzing unit 101 and the program parallelizing unit 102.

As described above referring to step S111 of the flowchart of FIG. 4, the conversion of a loop is performed only if the loop control statement of the loop is implemented in a form other than internal processes of the loop. Specifically, if the loop control statement of the loop is not executed within the loop, the loop is converted to a loop containing a conditional statement for executing the loop control statement and including a process to terminate the loop when the condition under the conditional statement is met.

More specific examples will be described referring to FIGS. 7A to 7C and 8A to 8C. FIGS. 7A to 7C show examples where a process executing the loop control statement is described as a conditional statement of a loop. Specifically, in codes 701 shown in FIG. 7A, line 4 to line 7 constitute a loop using a while conditional statement. The while conditional statement is placed at the beginning of the loop and determines whether or not a process is to be migrated into the loop, and the termination process is not an internal process of the loop.

In the example of the codes 701, the conditional statement of the loop is inserted within the loop as an internal process, and the loop itself is converted to an infinite loop, namely a loop whose number of iterations is not defined. As a result, the sequential program is converted to a sequential program in which loop parts can be parallelized and which produces results equivalent to those of the original sequential program. FIG. 7B shows an example where a loop included in the codes 701 is converted to a loop that can be parallelized. In codes 702 of FIG. 7B, a loop is implemented as an infinite loop using a for statement and the while conditional statement of the loop in the codes 701 is converted into an if conditional statement, which is inserted within the loop. In this example, the infinite loop is implemented using a for statement and a determination process is executed using an if statement. However, a while statement or a method specific to each architecture may be used as long as an equivalent process can be implemented.

Whether a loop needs to be converted may be determined, by statically analyzing the sequential program 110 by the program analyzing unit 101 and determining the necessity based on the analysis result. This can be implemented by making the loop control information 120 output from the program analyzing unit 101 contain information on description of a process executing the loop control as a conditional statement of the loop or on inclusion of a code executing an exception handling. In the codes 701, the while conditional statement on line 4 corresponds to a loop control instruction. Thus, the loop control information 120 is configured to indicate that the loop control instruction is described on line 4 as a conditional statement of the loop as the description "4:End: Loop" in information 703 as shown in FIG. 7C. The loop converting unit 202 converts the loop based on the loop control information 120.

Any grammar or the like may be used also for the loop control information 120 in this case as long as the loop control information 120 is in a form that can pass necessary information as described above. Alternatively, the user may analyze source codes, input whether or not loop conversion is necessary directly or by modifying output information to the program analyzing unit 101 or the program parallelizing unit 102 through the program analyzing unit 101, the loop division information 130 or the like.

FIGS. 8A to 8C show examples where an exception handling including the entire loop to be parallelized is described. Note that pseudo-codes described in accordance with the notation of the C++ language are used for the examples of codes in FIG. 8 since the C language does not provide syntaxes for an exception handling.

An exception handling is a mechanism that executes a special process for an exception occurring during execution of a program. Specifically, in an exception handling, when a certain abnormality occurs during execution of a process in a program, the process is interrupted and another process is executed. In the C++ language or the Java (registered trademark) language, for example, codes where an exception may occur are enclosed by a try statement of an exception handling syntax and occurrence of an exception is notified using a throw statement if an error occurs therein. If occurrence of an exception is notified, a process in a catch statement is executed. In this manner, a process associated with the exception is executed.

In codes 801 shown in FIG. 8A, a try statement is placed on line 4, and a loop to be parallelized is described in parentheses of the try statement (line 5 to line 6). In addition, a catch statement associated with the try statement is described immediately after the try statement. If an exception occurs in a loop described on line 5 to line 8, the exception is caught by the try statement and the process proceeds to the catch statement outside of the loop, which results in that the loop control statement is not a process inside of the loop.

If a loop to be parallelized is described in the parentheses of a try statement as in the example of the codes 801, the loop is converted in a manner that each process in the loop obtained by dividing the loop based on the loop division information 130 is individually enclosed by parentheses of the try statements so that the catch statement is executed thereafter. Furthermore, the loop is converted so that the process described in the catch statement is included and the loop is terminated if the catch statement occurs.

FIG. 8B shows an example where a loop included in the codes 801 is converted to a loop that can be parallelized. In codes 802 of FIG. 8B, each process in a loop of the codes 801 divided based on the loop division information 130 is enclosed in parentheses of a try statement and a catch statement associated with each statement is described. In the codes 802, a process on line 6 of the code 801 and a process on line 7 of the codes 801 are assumed to be divided respectively according to the loop division information 130. More specifically, in the codes 802, a try statement and an associated catch statement are described (line 5 to line 11 of codes 802) for the process on line 6 in the loop of the codes 801, and a try statement and an associated catch statement are described (line 12 to 18 of codes 802) for the process on line 7 in the loop of the codes 801.

In this case, the loop control information 120 is configured to indicate that an exception handling including the entire loop to be parallelized is described using the description "End:exception" of information 803 in FIG. 8C. The loop converting unit 202 converts the loop based on this information. Any grammar or the like may be used also for the loop control information 120 in this case as long as the loop control information 120 is in a form that can pass necessary information as described above. Further, the user may analyze source codes, and input whether or not loop conversion is necessary directly or by modifying output information to the program analyzing unit 101 or the program parallelizing unit 102 through the program analyzing unit 101, the loop division information 130 or the like.

Next, in step S113 of FIG. 4, the loop parallelizing unit 203 divides a loop to be parallelized in the sequential program 110 into processes based on the loop division information 130. The loop parallelizing unit 203 converts processes obtained by the division into a form that can be parallelized. While the processes are converted into threads in the embodiment, the processes may be converted into other forms as described above. Then, the loop parallelizing unit 203 adds processing for ensuring values of data to be used after termination of the loop using the loop control information 120 and the change information 121 and performs parallelization.

In this example, the loop control information 120 is the information 602 shown in FIG. 63 where thread_3 includes the loop control statement. The change information 121 is the information 603 shown in FIG. 60, which indicates that thread_2 changes data to be used after termination of the loop. Referring to the codes 501 of FIG. 5, thread_2 changes the value of data "total" to be used after termination of the loop and thread_3 executes a loop control statement "break". The number of loop control statements and the number of threads having a loop control statement is not limited to one.

The loop parallelizing unit 203 adds different processes to each of three types of threads including threads having a loop control statement, threads that change values of data to be used after termination of the loop and other threads. In this example, manipulation of a structure for loop control is implemented by adding a process that manipulates a structure for loop control as a function in the program and calling the function. However, the manipulation is not limited to this example. For example, processes of manipulating structures for loop control may be provided as a library and a necessary process may be called from the library. Alternatively, the process of manipulating a structure for loop control may be implemented by passing and receiving data directly between threads through interthread communication using a first-in first-out (FIFO) or a dedicated instruction provided by the architecture.

FIG. 9 is an example flowchart illustrating the processing in step S113 of FIG. 4 in more detail. First, in step S130, the loop parallelizing unit 203 divides each process in a loop of the sequential program 110 into threads based on the loop division information 130. Next, in step S131, a function for loop control and a structure for loop control are added so as to be accessed from each thread. In addition, a process of initializing the structure for loop control is added. Next, in step S132, a variable for counting the number of loop iterations is added to each thread created in step S130. Next, in step S133, processing on threads having a loop control statement among the threads created in step S130 is performed.

Next, in step S134, processing is performed on threads changing data that need to be ensured, namely, on the threads which modify data to be used after termination of the loop. Finally, in step S135, processing on the other threads, namely the threads other than those processed in steps S133 and S134 is performed. The intermediate parallelized program 131 is created in the end as described above.

The processing in step S130 is described here in more detail. A process performing division is specified in the loop division information 130 as shown in the information 601 of FIG. 6A. In step S130, the loop parallelizing unit 203 divides each process in the loop according to the specification. Further, the divided processes are converted into threads. Specifically, the loop parallelizing unit 203 describes a process in each thread individually in a form according to a function of the C language, for example, and divides the sequential program 110 based on the sequential program 110 and the loop division information 130.

More specifically, the loop parallelizing unit 203 divides line 7 of the codes 501 shown in FIG. 5 into thread_1, line 8 thereof into thread_2, and lines 9 to 11 thereof into thread_3 according to the loop division information 130 shown as the information 601, and describes the loop part of the codes 501 as the three independent threads including thread_1, thread_2 and thread_3.

Thread_2 is a thread that changes data to be used after termination of the loop, and thread_3 is a thread that jumps out of the loop depending on the condition. Thread_1 is a thread corresponding to none of these types. The number of threads obtained by dividing the loop is not limited to three.

One or more thread having a loop control statement, one or more thread that changes data to be used after termination of the loop and one or more thread that does not correspond to any of these types do not have to be present, and the number of each thread may be zero. If no thread corresponding to each of the types is present, processing for such a type is not executed. Moreover, if no thread having a loop control statement is present, the program parallelizing unit 102 works only to convert the loop into a form that can be parallelized. The process specified in the loop control information 120 and the process specified in the change information 121 may be the same process. Accordingly, a control process for other termination control may be inserted even if a plurality of threads each having a loop control statement is present.

Codes for calling the respective threads including thread_1, thread_2 and thread_3 and a code for waiting for termination of the threads at the end are inserted in the original loop and the original process is replaced by the codes. More detailed description will be given referring to FIG. 10 and FIG. 5 that is described above. The codes 1001 of FIG. 10 is example of the intermediate parallelized program 131 generated by the loop parallelizing unit 203 based on the sequential program 110. In FIG. 10, the codes 1001 are shown in a state where processing related thereto is finished and the part thereof necessary for description of the embodiment is completed.

The loop parallelizing unit 203 inserts codes on line 7 to line 12 of the codes 1001 of FIG. 10 at either of immediately before the first line of the loop, inside the loop and immediately after the last line of the loop of the codes 501 shown in FIG. 5. The codes on line 7 to line 12 of the codes 1001 indicate that parallel processing is performed. More specifically, the code "fork(thread_1)" on line 7 of the codes 1001 indicates that thread_1 is generated and a process thereof is performed by another core or processor or the like. The code "join(thread_1)" on line 10 of the codes 1001 indicates that a wait state until the process of thread_1 is terminated is entered. In other words, it is indicated in this example that the threads including thread_1, thread_2 and thread_3 are processed in parallel by a plurality of cores or processors.

It should be noted that the method for dividing a loop in the sequential program 110 into threads is not limited to this method. The method for dividing a loop into threads and parallelizing the threads differs depending on how the architecture, the system and parallel processing by which the converted parallelized program is to be run are implemented.

For example, a method of describing each process in a thread individually in a form like a function of the C language and dividing the process may be used. Alternatively, a method of describing each process in a thread in a form like a class of the C++ language or the Java (registered trademark) language and dividing the process may be used. Still alternatively, a method of enclosing individual processes to be divided by parentheses "{ }" to divide the processes may be used. Further, if an architecture or a program language having special syntaxes dedicated to parallel processing, a method of inserting such syntaxes to divide and parallelize processes may be used.

Further, a method of describing codes in which a call part of a thread is enclosed by a loop so that the thread is called, a plurality of times without describing the loop part in the thread may be used instead of a form calling the thread each time unlike the present embodiment. Still further, if a method for calling a thread is defined in the architecture or the programming language, the method for dividing and parallelizing needs to conform therewith.

In the embodiment, a process in a loop is simply divided into threads. Alternatively, a loop may be divided according to the number of iterations of the loop. For example, a loop may be divided into the number of iterations up to 50 and the number of iterations over 50. In this case, the program analyzing unit 101 analyzes the dependencies and the like regarding the divided processes as separate processes. Alternatively, a dividing method combining the method of dividing a process in a loop and the method of dividing according to the number of iterations of a loop may be employed.

Next, the processing of adding a function, a data structure and an initialization process for loop control in step S131 of FIG. 9 will be described in more detail. First, referring to FIG. 11, examples of a data structure and a function for use in loop control are described. Codes 1101 shown in FIG. 11 and the codes 1001 shown in FIG. 10 described above constitute the intermediate parallelized program 131. In FIG. 11, the codes 1101 are shown in a state where processing related thereto is finished and the part thereof necessary for description of the embodiment is completed.

In the codes 1101 of FIG. 11, codes on line 1 to line 4 are codes to define a data structure of data "cancel_state" for checking whether or not the loop is terminated. A code "char canceled" on line 2 is a code to define a variable "canceled" indicating whether or not the loop is terminated. The variable "canceled" is "1" to indicate that the loop is terminated or is "0" to indicate that the loop is being executed. A code "unsigned long count" on line 3 is a code to define a variable "count" indicating the number of counts of an innermost loop including a loop control statement. Thus, the data "cancel_state" whose structure is defined as described above can be used to know at which iteration the loop is terminated and to determine how the loop proceeds after termination of the loop as a result of termination controls of the loop by a plurality of cores, respectively.

In the codes 1101, a code "struct cancel_state cancel [NUM_CONT_STAT]" on line 6 is a code to provide a content of the data structure "cancel_state" described above. A value "NUM_CONT_STAT" indicates the number of loop control statements present in a loop to be parallelized. The data structure "cancel_state" is provided for the number of the loop control statements.

In the codes 1101, codes on line 8 to line 13 are a function to initialize the variable "canceled" and the variable "count". Codes on line 15 to line 20 of the codes 1101 constitute a function placed in a thread having a loop control statement where arguments thereof are a value "canceled" indicating whether or not the loop is terminated and a variable "cancel_ID" indicating an ID unique to each loop control statement. A code on line 16 is a code to update the variable "canceled". As a result of an if statement on line 17, the variable "count" is incremented by 1 on line 18 if the loop is not terminated.

In the codes 1101, codes on lines 22 to 34 are a function to check whether or not the number of loop iterations of a thread (thread_2 in this example) that changes data to be used after termination of the loop exceeds the number of loop iterations of a thread (thread_3 in this example) having a loop control statement. This function is also to check whether or not the number of loop iterations of a thread (thread_1 in this example) that does not change data to be used after termination of the loop exceeds the number of loop iterations of a thread having a loop control statement.

A variable "count" on line 22 is an argument indicating the current number of loop iterations of a thread. A variable "effect" on the same line is an argument indicating whether the thread changes data to be used after termination of the loop, namely data to be ensured outside of the loop. The variable "effect" is a value "1" to indicate that the thread changes data or is a value "0" to indicate a thread not changing data. A variable "cancel_ID" on the same line is an argument indicating an ID unique to each loop control statement.

In the codes 1101, an if statement on line 23 and a while statement on lines 24 to 26 indicate that the thread that changes data to be used after termination of the loop waits until the number of processed loop iterations becomes equal to the number of loop iterations of the thread having a loop control statement.

In step S132 of FIG. 9 described above, a syntax to update a variable to save the number of loop iterations is inserted after determination of whether or not loop control statement is to be executed. Therefore, in a case where a thread that changes data to be used after termination of the loop precedes a thread having a loop control statement in the sequential program 110, if the while statement on lines 24 to 26 of the codes 1101 indicates that the number of loop iterations of the thread having a loop control statement is n, the thread that changes data to be used after termination of the loop is also permitted to execute up to a process at the nth loop iteration. Otherwise, it is permitted to execute up to a process at the (n−1)th loop iteration.

An if statement on line 27 of the codes 1101 actually checks whether or not the loop is terminated. An if statement on line 30 of the codes 1101 checks whether or not the loop is terminated for a thread that does not change data to be ensured. This thread does not need a wait process since there is no dependency between this thread and the thread having a loop control statement. Therefore, in a case where a thread that does not change data to be used after termination of the loop precedes a thread having a loop control statement in the sequential program 110, if the if statement on line 30 of the codes 1101 indicates that the number of loop iterations of the thread that has a loop control statement is n, execution of the thread that changes data to be used after termination of the loop is also ensured up to a process at the nth loop iteration. Otherwise, execution is ensured up to a process at the (n−1)th loop iteration. In any case, the value "1" is returned when the loop is terminated.

Next, a method for adding the function and the data structure for loop control to the sequential program 110 will be described. First, the codes 1101 of FIG. 11 are inserted in a part where the codes 1101 can be executed by each thread created in step S130 of FIG. 9. If a process and a data structure for loop control are not provided as a function and a data structure as in the codes 1101 of FIG. 11, the process and the data structure that are provided are converted into forms that can be used by each thread created in step S130 of FIG. 9. In addition, a value "NUM_CONT_STAT" on lines 6 and 9 in the codes 1101 of FIG. 11 indicates the number of loop control statements present in the loop to be parallelized. The value is obtained from the loop control information 120 and actual counts are assigned thereto.

Further, the loop parallelizing unit 203 inserts a process of initializing data having the data structure for loop control in the loop part of the codes 501 of FIG. 5. More specifically, a code "reset_cancel_state( )" is inserted in the codes 1001 as shown on line 6 of the codes 1001 of FIG. 10. The code may be inserted anywhere before codes for parallel processing (codes on lines 7 to 12 of the codes 1001) inserted in step S130.

In this example, the number of threads having a loop control statement is only one, which is thread_3. Thus, only one data structure for loop control needs to be declared. On the other hand, if there are two or more threads having a loop control statement, it is configured such that processing can be executed for each loop control statement using a unique ID assigned to the statements, whereby the increased number of loop control statements can be executed. Information may be held by declaring a plurality of variables for loop control or using a data structure such as a list structure instead of an array form.

Next, processing of adding a variable for saving the number of loop iterations to each thread created in step S130 of FIG. 9 is performed in step S132 of FIG. 9. More specifically, a variable "count" that counts the number of loop iterations of the loop to be parallelized is additionally inserted for each thread in the codes 1001 of FIG. 10 as shown on lines 17 and 28 of the codes 1001. The variable "count" may be inserted anywhere before the loop. Further, a process of incrementing this counter is inserted into lines 23 and 34 of the codes 1001. The counter incrementing process may be inserted anywhere after determination that the loop control statement is not to be executed at a certain iteration and before execution of the next iteration. The number of loop iterations of a thread having a loop control statement is held by a data structure described above. Accordingly, if there is only one thread having a loop control statement, the variable "count" is not inserted for the thread having a loop control statement.

As a result of providing the variable "count" that counts the number of loop iterations, loops including a loop for which the counter number is not equal to the number of loop iterations owing to update within the loop of a loop counter declared in an original code or the like, a loop for which a loop counter is not declared in the first place, and a nested loop can also be parallelized using the codes 1101 of FIG. 11.

If a loop counter of a loop to be parallelized simply counts the number of loop iterations, the loop counter may be utilized without inserting the variable "count" as described above. Moreover, if there is only one thread having a loop control statement, the variable "count" is not needed for this thread and thus the processing in step S132 of FIG. 9 is not performed for this thread. In the case of the codes 501 of FIG. 5, there is only one loop control statement. Therefore, the variable "count" is not added for the thread having the loop control statement.

FIG. 12 is an example flowchart illustrating the processing on a thread having the termination process in step S133 of FIG. 9 in more detail. First, in step S140, the loop parallelizing unit 203 selects one thread having a loop control statement from threads generated by dividing a loop of the sequential program 110 in step S130 described above. The thread having a loop control statement can be known from the loop control information 120. In this example, thread_3 is selected as the thread having a loop control statement according to the information 602 of FIG. 63.

Next, in step S141, the loop parallelizing unit 203 assigns a unique ID to each loop control statement. This ID is assigned as a unique ID for the entire the loop control statement regardless of the types of loop control statements, which will be described later. If there is a plurality of loop control statements in one process, a unique ID is assigned to each of the loop control statements. As described above, information on the number of loop control statements that are present can also be known from the loop control information 120. In addition, it is assumed in this example that the IDs are assigned in ascending order starting from "0". The manner in which the IDs are assigned is not limited to this example, and any values may be assigned as long as the IDs are unique to each loop control statements. However, if the IDs are used directly as arguments to access the data structures as in this example, the IDs need to be assigned in such a manner that a failure is not caused while running the program by accessing data outside of the array or the like. Since one loop control statement is present in this example, an ID "0" is assigned to the one loop control statement.

Next, in step S142, the loop parallelizing unit 203 performs processing for conforming the result of executing the sequential program 110 to the result of executing the final parallelized program 140. This processing in step S142 differs depending on the characteristics of the loop control statement of the loop. If the loop control statement is a process such as "break" to terminate only the innermost loop, processing is required when the loop to be parallelized has a nested structure of a plurality of loops. In this case, a code is inserted so that each thread does not proceed to a next process and enters a wait state until the innermost loop of all threads is terminated by loop control statements.

A code is inserted in any one thread so that a code "reset_cancel_state( )" for resetting a structure for loop control is executed after termination of the loop of all the threads and then other processes of the threads are resumed. In this manner, the processes of the respective threads can be resumed after resetting the structure for loop control. This processing in step S142 is omitted if the processing is not particularly needed as in the example of the codes 501 of FIG. 5.

Next, in step S143, the loop parallelizing unit 203 inserts a process for updating the data structure for loop control in the code of the thread selected in step S140. More specifically, a code "update_cancel_state(1,0)" on line 41 is inserted in the codes 1001. The code may be inserted anywhere other than within a conditional statement determining whether or not a loop control statement of the loop is to be executed and after the loop control statement. Further, a code "update_ cancel_state(0,0)" is inserted as shown on line 44 of the codes 1001. The code may be inserted anywhere after determination that the loop control statement is not to be executed at a certain iteration and before execution of the next iteration.

The processing proceeds to step S144 where the loop parallelizing unit 203 determines whether or not there still is any unselected thread having a loop control statement. If it is determined that there is an unselected thread having a loop control statement, the processing returns to step S140 where a next thread having a loop control statement is selected. If, on the other hand, it is determined that all the threads having a loop control statement have been selected and that processing in steps S141 to S143 described above is completed, the series of processing in the flowchart of FIG. 12 is terminated. In this example, only thread_3 out of the three threads obtained by the division in step S130 of FIG. 9 has a loop control statement. Accordingly, the series of processing in steps S140 to S144 is each performed once and the processing of the flowchart of FIG. 12 is terminated.

Next, the processing on the threads changing data that need to be ensured in step S134 of FIG. 9 will be described in more detail. FIG. 13 is an example flowchart illustrating the processing in step S134 of FIG. 9 in more detail.

First, in step S150, the loop parallelizing unit 203 determines whether or not there is any thread for which processing of steps S151 to S153 has not been performed in the threads changing data that need to be ensured, namely values of data to be used after termination of the loop, among the threads generated by dividing the loop of the sequential program 110 in step S130 described above. If it is determined that there is such a thread, the processing proceeds to step S151 where one thread that changes data to be used after termination of the loop is selected.

The threads changing data that need to be ensured, namely the threads changing values of data to be used after termination of the loop can be known from the change information 121. In this example, there is only one thread having a loop control statement. Therefore, thread_2 is selected as the thread according to the information 603 of FIG. 6C. If there is only one thread having a loop control statement as the codes 501 of FIG. 5, optimization may be made in such a manner that the processing in steps S151 to S153 is not performed for the thread having the loop control statement even if the thread has changed values of data to be used after termination of the loop.

Next, in step S152, the loop parallelizing unit 203 inserts a loop control statement in the code of the thread selected in step S151. More specifically, the loop parallelizing unit 203 inserts a code "break" that is loop control statement as shown on line 32 of FIG. 10 in the codes 1001.

The code "break" may be inserted anywhere in the processes in the original loop as long as the relative locations of the process in the thread and the loop control statement are maintained. Thus, if the loop control statement is located before the process in the thread in the processes in the original loop, the loop control statement is inserted before the process in the thread. On the contrary, if the loop control statement is located after the process in the thread, the loop control statement is inserted after the process in the thread.

The loop control statement of the loop inserted here is the same as the loop control statement that the thread processed in the steps of FIG. 12 has. In this example, the code "break" is used and thus inserted. However, if the loop control statement of the loop is changed as a result of performing the processing step S143 of FIG. 12, the changed statement is inserted. If there is a plurality of loop control statements, the inserting processing is performed the number of times corresponding to the number of loop control statements. When there is a plurality of loop control statements, the loop control statements are inserted so that the relative locations of the respective loop control statements in the sequential program 110 are maintained.

Next, in step S153, the loop parallelizing unit 203 inserts a process for checking a data structure for loop control in the code of the thread selected in step S150. More specifically, codes "if(check_cancel_state(count,1,0)==1){" and "}" are inserted in the codes 1001 as shown on lines 31 and 33 of the codes 1001 of FIG. 10. The codes may be inserted immediately before and immediately after the loop termination process inserted in step S152 to form a block enclosing the loop control statement. As a result of inserting the process according to the codes "if(check_cancel_state(count,1,0)==1){" and "}", the process of thread_2 checks whether the process of thread_3 is terminated or continued. If terminated, thread_2 also terminates the loop process. If continued, thread_2 also continues the loop process. When the processing in step S153 is terminated, the processing returns to step S150.

If it is determined in step S150 described above that there is no thread on which the processing in steps S151 to S153 has not been performed among the threads changing values of data to be used after termination of the loop, the series of processing in the flowchart of FIG. 13 is terminated. In this example, only thread_2 is to be processed. Accordingly, the processing in steps S150 to S153 is each performed once and the processing in the flowchart of FIG. 13 is terminated.

Figure 14:
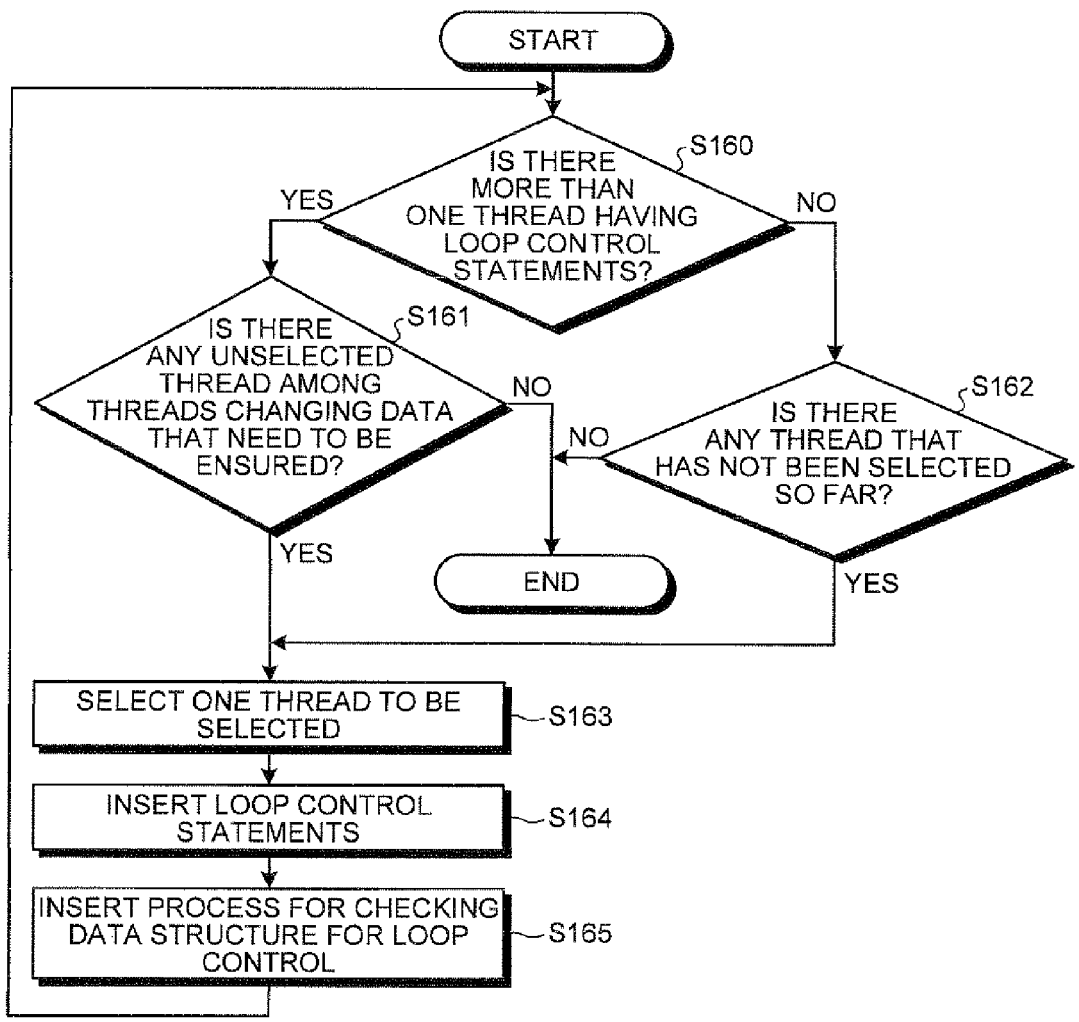
FIG. 14 is a flowchart illustrating an example of processing on other threads.

Next, the processing on the other threads, namely the threads that have no loop control statement and that do not change values to be used after termination of the loop, in step S135 of FIG. 9 will be described in more detail. FIG. 14 is an example flowchart illustrating the processing in step S135 of FIG. 9 in more detail.

First, in step S160, the loop parallelizing unit 203 determines whether there is more than one thread having a loop control statement based on the loop control information 120. If it is determined that there is more than one thread having a loop control statement, the processing proceeds to step S161.

In step S161, the loop parallelizing unit 203 determines whether or not there is any unselected thread, namely any thread for which processing of steps S163 to S165, which will be described later, has not been performed in the threads changing data to be used after termination of the loop, namely data that need to be ensured, among the threads generated by dividing the loop of the sequential program 110 in step S130 described above. If it is determined that there is no unselected thread, the series of processing in the flowchart of FIG. 14 is terminated. On the other hand, if it is determined that there is such an unselected thread, the processing proceeds to step S163 where one thread changing values of data to be used after termination of the loop is selected.

If it is determined in step S160 described above that there is only one thread having a loop control statement, the processing proceeds to step S162. Since there is only one thread having a loop control statement in this example, the processing proceeds to step S162.

In step S162, the loop parallelizing unit 203 determines whether or not there is any thread that has not been selected in steps S133 and S134 among the threads generated by dividing the loop of the sequential program 110 in step S130 described above. If it is determined that all the threads have been selected, the series of processing in the flowchart of FIG. 14 is terminated. On the other hand, if it is determined that there is an unselected thread, the processing proceeds to step S163 where one unselected thread is selected. In this example, since thread_1 has never been selected in the processing so far, thread_1 is to be selected.

In step S163, the loop parallelizing unit 203 selects one thread that is determined to be selected in step S161 or step S162 as described above. In this example, since thread_1 has never been selected in the processing so far, thread_1 is to be selected.

Next, in step S164, the loop parallelizing unit 203 inserts a loop control statement in the program and the code of the threads selected in step S163. More specifically, the loop parallelizing unit 203 inserts a code "break" that is a loop control statement as shown on line 21 of FIG. 10 in the codes 1001.

The code "break" may be inserted anywhere in the processes in the original loop as long as the relative locations of the process in the thread and the loop control statement are maintained. Thus, if the loop control statement is located before the process in the thread in the processes in the original loop, the loop control statement is inserted before the process in the thread. On the contrary, if the loop control statement is located after the process in the thread, the loop control statement is inserted after the process in the thread. The loop control statement inserted here is the same as the loop control statement that the thread processed in the steps of FIG. 12 has. In this example, the code "break" is used and thus inserted. If there is a plurality of loop control statements, the inserting processing is performed the number of times corresponding to the number of loop control statements. When there is a plurality of loop control statements, the termination controls are inserted so that the relative locations of the respective loop control statements in the sequential program 110 are maintained.

Next, in step S165, the loop parallelizing unit 203 inserts a process for checking a data structure for loop control in the code of the thread selected in step S163. More specifically, codes "if(check_cancel_state(count,0,0)==1){" and "}" are inserted in the codes 1001 as shown on lines 20 and 22 of the codes 1001 of FIG. 10.

The codes "if(check_cancel_state(count,0,0)==1){" and "}" may be inserted immediately before and immediately after the loop termination process inserted in step S164 to form a block enclosing the a loop control statement. As a result of inserting the process according to the codes "if (check_cancel_state(count,0,0)==1){" and "}", the process of thread_1 checks whether the process of thread_3 is terminated or continued. If terminated, thread_1 also terminates the loop process at the number of iterations at which thread_3 terminated the loop process. If continued, thread_1 also continues the loop process. When the processing in step S165 is terminated, the processing returns to step S160.

In this example, there is only one thread having a loop control statement and only thread_3 is a thread that is not selected in steps S133 and S134 described above. Therefore, the processing in steps S160, S162 to S165 is each performed once and the processing in the flowchart of FIG. 14 is terminated. Accordingly, the series of processing in the flowchart of FIG. 9 is terminated, the processing of the loop parallelizing unit 203 is terminated, and generation of the intermediate parallelized program 131 is completed. The intermediate parallelized program 131 includes the codes 1101 and the codes 1001 described above, for example.

In this example, the code "break" is used for the loop control statement. However, the loop control statement is not limited thereto. As a first example, a loop control statement such as a code "return" that terminates the loop itself and also terminates the function to which the loop belongs may be used. FIG. 15A shows an example of the sequential program 110 in which such a code "return" is used as the loop control statement. Codes 1501 shown in FIG. 15A correspond to the codes 501 of FIG. 5 described above. The code "return" as the loop control statement is described on line 10 of the codes 1501. If an if statement on line 9 is satisfied and the code "return" on line 10 is executed, a return value "0" is returned and a main function "foo( )" is terminated.

FIG. 15B shows examples of codes 1502 for forming the intermediate parallelized program 131 that can be obtained as a result of performing the processing in the flowcharts of FIGS. 12, 13 and 14 described above on the codes 1501 of FIG. 15A.

In the codes 1502 of FIG. 15B, first, in step S142 of FIG. 12, the loop control code "return" of the original codes 1501 is changed to a loop control code "goto" in each thread and a label "loop_end" indicating the branch destination of this control code is inserted immediately after termination of a loop to be parallelized in each thread. Codes shown on lines 13 to 15 of the codes 1502 are further inserted to the codes 1501 in which the loop control code is changed. It is thus configured such that the threads including thread_1, thread_2 and thread_3 check whether or not the loop is terminated by the loop control code "goto" inserted as a result of the above-described operation, and the code "return" is executed when the loop is terminated.

In this example, the loop to be parallelized does not have a nested structure of a plurality of loops but is a single loop. However, the loop to be parallelized is not limited to this example and may have a nested structure of a plurality of loops. If a loop control statement such as the statement "return" of this example that terminates the loop itself and the function to which the loop belongs is used, a label "loop_end" is inserted immediately after the outermost loop of a nested structure to avoid such a situation where the result is different from that of the original sequential program.

There may be more than one code "return" similarly to the code "break". In such case, the codes "return" may have different return values. Therefore, the ID unique to each loop control statement assigned in step S141 of FIG. 12 is used to add determination based on the ID in addition to the codes shown on lines 13 to 15 of the codes 1502. As a result, it is possible to avoid such a situation where the result is different from that of the original sequential program.

As a second example, loop control using the code "goto" to jump to a process at an optional part outside of the loop can be used. FIG. 16A shows an example of the sequential program 110 in which the code "goto" is used as the loop control. Codes 1601 shown in FIG. 16A correspond to the codes 501 of FIG. 5 described above. The code "goto" as the loop control statement is described on line 10 of the codes 1601, and a code "label_1" is described on line 14 as a jump destination of the code "goto". If an if statement on line 9 is satisfied and the code "goto" on line 10 is executed, the process jumps to line 14 and a return value "0" is returned.

FIG. 16B shows examples of codes 1602 for forming the intermediate parallelized program 131 that can be obtained as a result of performing the processing in the flowcharts of FIGS. 12, 13 and 14 described above on the codes 1601 of FIG. 16A.

In the codes 1602 of FIG. 16B, first, in step S142 of FIG. 12, the branch destination label of the loop control code "goto" of the original codes 1601 is changed in each thread and a label "loop_end" indicating the branch destination of this control code is inserted immediately after termination of the loop to be parallelized in each thread. A code shown on line 13 of the codes 1602 is further inserted to the codes 1601 in which the loop control code is changed. It is thus configured such that the threads including thread_1, thread_2 and thread_3 check whether or not the loop is terminated by the loop control code "goto" changed as a result of the above-described operation, and the code "goto" is executed so that the process jumps to the code "label_1" on line 15 when the loop is terminated.

In this example, the loop to be parallelized does not have a nested structure of a plurality of loops but is a single loop. However, the loop to be parallelized is not limited to this example and may have a nested structure of a plurality of loops. If a loop control such as the loop control code "goto" of this example by which the process jumps to a process at an optional part outside of the loop, a label "loop_end" is inserted immediately after the outermost loop of a nested structure to avoid such a situation where the result is different from that of the original sequential program.

There may be more than one loop control code "goto" similarly to the code "break" described above. In such case, the codes "goto" may have different labels of jump destination. Therefore, the ID unique to each loop control statement assigned in step S141 of FIG. 12 is used to add determination based on the ID in addition to the code shown on line 13 of the codes 1602. It is thus possible to avoid such a situation where the result is different from that of the original sequential program.

As a third example, loop control statement such as a code "continue" in which only some of the processes at a certain iteration are skipped and the process proceeds to a process of the next iteration can be used. FIG. 17A shows an example of the sequential program 110 in which the code "continue" is used as the loop control. Codes 1701 shown in FIG. 17A correspond to the codes 501 of FIG. 5 described above. However, the loop control statement is executed at the beginning of the loop unlike the codes 501. This is because, if the code "continue" is at the end of the loop, there will be no difference in the result of processes even if the code "continue" is not inserted.

In processing on the code "continue", codes are not inserted in a thread like thread_1 that does not include a loop control statement and that does not change any value to be used after termination of the loop unlike other loop control statements. Thus, the processing in the flowchart of FIG. 14 is not performed. This is because the code "continue" skips processes of only one iteration and thus overhead is more likely to be smaller if the code "continue" executed a plurality of times is ignored and the processes to be skipped are executed rather than adding to all of the executed codes "continue" and skipping the processes. Such processes can be achieved by excluding the processing that performs the processing in the flowchart of FIG. 14 from the processing in step S143 in the flowchart of FIG. 12.

In the codes 1701, the code "continue" as the loop control statement is described on line 8. If an if statement on line 7 is satisfied and the code "continue" on line 8 is executed, the processes at the next iteration are executed without executing the processes after the code "continue" in the loop.

FIG. 17B shows examples of codes 1702 for forming the intermediate parallelized program 131 obtained as a result of performing the processing in the flowcharts of FIGS. 12 and 13 described above on the codes 1701 of FIG. 17A.

In this example, the loop to be parallelized does not have a nested structure of a plurality of loops but is a single loop. However, the loop to be parallelized is not limited to this example and may have a nested structure of a plurality of loops. There is not necessarily only one type of the loop control statements such as the codes "break", "return", "goto" and "continue" in a loop to be parallelized, but there may be a plurality of types thereof.

As described above, the loop parallelizing unit 203 performs parallelizing processing on the sequential program 110 using the data structure "cancel_state", the function "reset_cancel_state( )", the function "update_cancel_state( )" and the function "check_cancel_state( )" defined in the codes 1101 of FIG. 11 to generate the intermediate parallelized program 131. The intermediate parallelized program 131 generated at this stage does not run properly because codes for ensuring data dependencies between threads are not inserted therein. The parallelized program 140 that runs properly even if there is any data dependency between threads can be obtained by converting the intermediate parallelized program 131 by the program converting unit 103 so as to ensure the data dependency, which will be described later. If there is no data dependency between threads, the program converting unit 103 output the intermediate parallelized program 131 as the parallelized program 140 without any change.

The intermediate parallelized program 131 generated as described above by the loop parallelizing unit 203 is output through the output unit 204. The intermediate parallelized program 131 output from the output unit 204 is described in a programming language such as the C language or the Java (registered trademark) language. The intermediate parallelized program 131 is not limited thereto and may be described in a programming language that is a programming language extended by adding syntaxes for parallelization the programming language such as the C language or the Java (registered trademark) language. Alternatively, the intermediate parallelized program may be described using a programming language specific to a certain processing device. Furthermore, instead of the programming language, an intermediate language or a machine language for a program parallelization system may be output from the output unit 204 as long as information corresponding to the intermediate parallelized program 131 can be passed between the program parallelizing unit 102 and the program converting unit 103. The source codes of the intermediate parallelized program 131 are output through the output unit 204 as text data, for example. The source codes may be binary data.

The source codes of the intermediate parallelized program 131 may be stored in a manner that all information is stored collectively in one file or in a manner that information is divided and stored in a plurality of files. The source codes of the sequential program 110 input to the input unit 201 and the source codes of the intermediate parallelized program 131 output from the output unit 204 may be described in the same format or in different formats. The intermediate parallelized program 131 may be output from the output unit 204 by using a commonly used file system, for example. Alternatively, the source codes of the intermediate parallelized program 131 may be output to another terminal or the like via a network. Still alternatively, the source codes may be output interactively using a GUI, for example.

Next, examples of functions of the program converting unit 103 will be described. The intermediate parallelized program 131 output from the program parallelizing unit 102 is input to the program converting unit 103. As described above, the data dependency information 122 output from the program analyzing unit 101 is also input to the program converting unit 103. The program converting unit 103 converts the intermediate parallelized program 131 into the parallelized program 140 in which the data dependency is ensured based on the intermediate parallelized program 131 and the data dependency information 122.

In the following, an example in which a program having the codes 1001 shown in FIG. 10 is converted using the data dependency information 122 shown as the information 604 in FIG. 6D will be described. FIG. 18 shows examples of codes 1801 for forming the parallelized program 140 obtained by converting the codes 1001 to reflect the data dependency information 122 therein. In FIG. 18, the codes 1801 are shown in a state where processing related thereto is finished and the part thereof necessary for the embodiment is completed. The codes 1101 shown in FIG. 11 are also required for the parallelized program 140 in addition to the codes 1801.

First, information "thread_1:temp[i]->thread_2:temp[i]" on line 1 of the information 604 of FIG. 6D shows that there is a data dependency of a variable "temp[i]" of thread_1 on a variable "temp[i]" of thread_2 at the same iteration number [i]. To resolve this, a code "PUT(thread_2[i],temp[i]);" on line 20 and a code "GET(thread_1[i],temp[i]);" on line 31 of the codes 1801 of FIG. 18 are inserted in the codes 1801.

Here, the code "PUT(thread_2[i],temp[i]);" on line 20 is a code to temporarily hold the variable within the parentheses "( )" in a memory, and the code "GET(thread_1[i],temp[i]);" on line 31 is a code to get the variable within the parentheses "( )" from the memory.

Specifically, data of the variable "temp[i]" can be passed from thread_1 to thread_2 at the same iteration number using the code "PUT(thread_2[i],temp[i]);" on line 20, and thread_2 can receive the data of the variable "temp[i]" from thread_1 at the same iteration number using the code on line 31.

It is assumed in this example that data are passed using a first-in first-out (FIFO). Specifically, it is assumed that data are stored in the FIFO in the memory by a code PUT and data in the FIFO are fetched using a code GET. If the number of data in the FIFO is increased, a process can be executed first even if a thread executing the instruction PUT runs at a higher speed than a thread executing the instruction GET as long as the FIFO still has space available for data. When the FIFO is full, the thread executing the code PUT is in a wait state until the FIFO has available space. When the FIFO is empty, the thread executing the code GET is in a wait state. Accordingly, processes can be executed in parallel without breaking the data dependencies.

Next, information on line 2 of the information 604 of FIG. 6D shows that there is a data dependency of a variable "total" of thread_2 on a variable "total" of thread_3. To resolve this, a code "PUT(thread_3[i],total)" on line 33 and a code "GET(thread_2,[i],total)" on line 43 of the codes 1901 of FIG. 18 are further inserted in the codes 1801. After checking and processing all information described in the data dependency information 122 in this manner, the parallelized program 140 including the codes 1801 shown in FIG. 18 and the codes 1101 described above is output from the program converting unit 103.

In the above description, the variables are passed between threads using the codes GET and PUT by the FIFO, the manner in which the variables are passed is not limited thereto. For example, variables can also be passed between threads if the data dependency is satisfied by replacing the codes by codes having the same functions as the codes GET and PUT described above among codes specific to the architecture or the language, by using global variables and a lock function temporarily permitting only access from a certain thread, or the like.

In the embodiment, the data dependencies between threads obtained by dividing a loop are ensured automatically by the program converting unit 103. However, the manner in which the data dependencies are ensured is not limited to this example. For example, the intermediate parallelized program 131 may be converted by performing such processing as described above directly by the user using a text editor or the like to generate the parallelized program 140.

Alternatively, the parallelized program 140 output from the program converting unit 103 may be improved directly by the user using a text editor or the like. Alternatively, only threads and data related to inserted codes resolving the data dependencies may be inserted in a form of comments in the parallelized program 140 output from the program converting unit 103, and the user may rewrite the parallelized program 140 into codes suitable for the environment in which the program runs by referring to the comments. Still alternatively, in this case, the parallelized program 140 in which only threads and data related to inserted codes resolving the data dependencies are inserted in a form of comments may be converted by a converting device provided for execution environment. Still alternatively, the source codes may be output interactively using a GUI, for example.

In the embodiment, the program analyzing unit 101, the program parallelizing unit 102 and the program converting unit 103 are used in combination. However, these units are not limited to this example. For example, for the program analyzing unit 101, the program parallelizing unit 102 and the program converting unit 103, a system other than that of the embodiment which is produced for other devices such as a parallelizing compiler may be used, or a system obtained by converting the system for a system of the embodiment may be used.

The parallelized program 140 output from the program parallelization system described above is executed on an architecture of a multicore processor, for example. Specifically, each of the threads in the parallelized program 140 obtained by dividing and parallelizing a loop of the sequential program 110 is executed by each of cores constituting the multicore processor. Alternatively, the parallelized program 140 may be applied even to a single-core processor if it has an architecture allowing a plurality of threads to be executed by one core. Further, the parallelized program 140 may also be applied to a multiprocessor having a plurality of CPUs or a system using a plurality of computers if a plurality of threads can be executed in parallel therein.

The parallelized program 140 output from the program parallelization system is compiled by a compiler and executed on a computer system. In this case, the sequential program 110 including a loop whose number of iterations is unknown before execution can be run in parallel by means of data structures and functions generated by the program parallelizing unit 102 (refer to the codes 1101 of FIG. 11) and processes manipulating the data structures (for example, refer to the codes 1801 of FIG. 18). As described above, a part corresponding to the codes 1101 of FIG. 11 can also be implemented by a method using a library or the like. In such case, the part is converted into a form that can be executed on a computer system.

Figure 19:
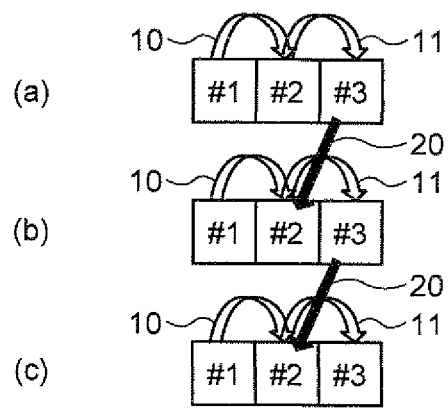
FIG. 19 shows an example of dependencies between three parallelized threads.

FIG. 19 shows an example of dependencies between threads in a case where a loop of the sequential program 110 is divided into three parallel threads. Processing blocks #1, #2 and #3 in FIG. 19 show threads corresponding to execution of processes at one iteration. FIGS. 19(*a*), 19(*b*) and 19(*c*) each show execution of processes at one iteration. Specifically, the processing blocks #1, #2 and #3 shown in FIG. 19(*a*) represent processes at corresponding iteration number, FIG. 19(*a*) shows a first iteration, FIG. 19(*b*) shows a second iteration, and FIG. 19(*c*) shows a third iteration, for example. It is assumed in the examples of FIG. 19 that the processing blocks #1, #2 and #3 have equal processing time per one iteration, and the same processing blocks #1 to #3 do not execute processes at the next iteration until the execution of processes at the current iteration is terminated. Even if such an assumption is not applicable in a case where the processing blocks have different processing times or processes at the next iteration are executed before termination of the current iteration, parallelization can be done by using the method of ensuring the dependencies as described above.

In FIG. 19, each of arrows 10, 11 and 20 between threads represents a dependency between threads. The white arrows 10 and 11 represent data dependencies. For example, the arrow 10 pointing from the processing block #1 to the processing block #2 indicates that data changed at the processing block #1 is used at the processing block #2. In this case, the process at the processing block #2 is reserved until the process at the processing block #2 is terminated. The arrow 11 is similar to the arrow 10.

Such data dependencies are ensured by the codes inserted by the program converting unit 103 as already described above. As described above, the method for setting data dependencies is not limited thereto.

In FIG. 19, the black arrow 20 represents a dependency according to a loop control statement. For example, the arrow 20 pointing from the processing block #3 of FIG. 19(a) to the processing block #2 of FIG. 19(b) indicates that data to be used at the processing block #2 at the next iteration after termination of a loop by the processing block #3 are changed at the processing block #3, and therefore, the processing block #2 at the next iteration has to be executed after determining whether or not the loop is terminated by the loop control statement of the loop at the processing block #3. For example, in this case, the processing block #2 at the second iteration (FIG. 19(b)) is reserved until the loop is determined to be terminated or continued at the processing block #3 at the first iteration (FIG. 19(a)).

Such dependencies according to a loop control statement are input to the program parallelizing unit 102 as the loop control information 120 and the change information 121 and processed by the codes inserted in the intermediate parallelized program 131 by the loop parallelizing unit 203 as already described above.

Figures 20A, 20B:
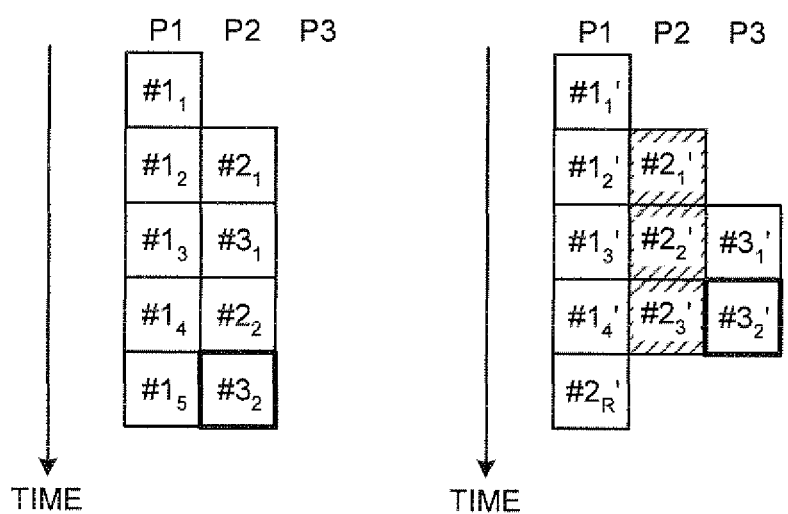
FIGS. 20A and 20B show examples of results of executing a parallelized loop.

FIGS. 20A and 203 show examples of results of executing the parallelized loop shown in FIG. 19. FIG. 20A is an example of an execution result in a case where the loop is parallelized according to the method of the embodiment. FIG. 203 shows an example of an execution result in a case where the loop is parallelized using rollback according to the conventional technology. In FIGS. 20A and 203, vertical arrows represent time, columns P1, P2 and P3 each represent one processing unit that executes parallelized processes, such as a core of a processor. In FIG. 20A according to the embodiment, the processing blocks #1, #2 and #3 correspond to thread_1, thread_2 and thread_3, respectively, described as examples in the embodiment. In addition, subscripts attached to the numbers of the processing blocks #1 to #3 indicate the iteration numbers. For example, a processing block #$1_1$ indicates a process at thread_1 at the first iteration. In FIGS. 20A and 203, each processing block is executed by a predetermined core. However, different cores may be used at different iterations.

First, an example of operations in a case where the loop is parallelized according to the method of the embodiment will be described referring to FIG. 20A and FIGS. 19(a) to 19(c). The parallelized program 140 constituted by the codes 1101 of FIG. 11 and the codes 1801 of FIG. 18 generated by the program parallelization system of the embodiment is compiled and subjected to link processing or the like to generate an executable file. The threads including thread_1, thread_2 and thread_3 are executed by executing the executable file on a CPU of a computer system, for example.

In FIG. 20A, the process of thread_1 at the first iteration is first executed by one of cores on the CPU. The core calls a function "check_cancel_state( )" that checks a data structure for loop control according to the processing block #$1_1$, namely thread_1 at the first iteration. Since the loop is not terminated at this point, the process continues.

When the execution at the processing block #$1_1$ at the first iteration is completed, data are passed from the processing block #$1_1$ to the processing block #$2_1$ by the process of the code PUT on line 20 of the codes 1801 of FIG. 18 and the process of the code GET on line 31 thereof as indicated by the arrow 10 in FIG. 19(a). As a result, the data dependency is resolved, and the processing block #$2_1$ can now be executed. Meanwhile, since there is no data dependency set from the processing block #$1_1$ to the processing block #$1_2$ at the second iteration, the processing block #$1_2$ can be executed. Accordingly, the processing block #$2_1$ at the first iteration and the processing block #$1_2$ at the second iteration are executed in parallel by different cores, respectively.

The core executing thread_1 calls the function "check_cancel_state( )" that checks a data structure for loop control according to the processing block #$1_2$, namely thread_1 at the second iteration. Since the loop is not terminated at this point, the process continues. Similarly, the core executing thread_2 calls the function "check_cancel_state( )" that checks a data structure for loop control according to the processing block #$2_1$, namely thread_2 at the first iteration. Since the loop is not terminated at this point, the process continues.

Next, the process of the code PUT on line 33 of the codes 1801 and the process of the code GET on line 43 thereof are executed by respective cores. As a result, the dependency from the processing block #$2_1$ to the processing block #$3_1$ shown by the arrow 11 in FIG. 19(a) is resolved, and the processing block #$3_1$ can now be executed. Meanwhile, since there is no data dependency set to the processing block #$1_3$ at the next iteration of the processing block #1, the processing block #$1_3$ can be executed. Accordingly, the processing block #$3_1$ at the first iteration and the processing block #$1_3$ at the second iteration are executed, in parallel by different cores, respectively.

The core executing thread_1 calls the function "check_cancel_state( )" that checks a data structure for loop control according to the processing block #$1_3$, namely thread_1 at the third iteration. Since the loop is not terminated at this point, the process continues.

Meanwhile, the core executing thread_3 calls the function "update_cancel_state( )" that updates a data structure for loop control according to the processing block #$3_1$, namely thread_3 at the first iteration. Since the condition for loop termination is not met at this point, this core updates a member variable "count" of a structure "cancel", notifies the process (in this example, the processing block #$2_2$, namely thread_2 at the second iteration) waiting for execution of thread_3 of the termination of the processes at the first iteration. As a result, the process is continued and the dependency of the processing block #$2_2$ shown by the arrow 20 in FIG. 19(a) is resolved.

Meanwhile, there is no dependency set to the processing block #$1_4$ at the next iteration. Accordingly, the processing block #$1_4$ at the fourth iteration and the processing block #$2_2$ at the second iteration are executed by different cores, respectively.

The core executing thread_1 calls the function "check_cancel_state( )" that checks a data structure for loop control according to the processing block #$1_4$, namely thread_1 at the fourth iteration. Since the loop is not terminated at this point, the process continues. Similarly, the core executing thread_2 calls the function "check_cancel_state( )" that checks a data structure for loop control according to the processing block #$2_2$, namely, thread_2 at the second iteration. Since the loop is not terminated at this point, the process continues.

Next, the processing block #$3_2$ and the processing block #$1_5$ at the fifth iteration are executed by different cores, respectively. The core executing thread_3 calls the function "update_cancel_state( )" that updates a data structure for loop control according to the processing block #$3_2$, namely thread_3 at the second iteration. Since the loop is terminated by thread_1 and the condition for loop termination is met at this point, the core executing thread_3 updates a member variable "canceled" of the structure "cancel" to "1", and notifies the threads including thread_1 and thread_2 of the termination of the loop by the process at the second iteration. Each core calls the function "check_cancel_state( )" to confirm this notification the next time when the core executes the threads including thread_1 and thread_2, and terminates the loop.

Next, processing of parallelizing the loop using rollback according to the conventional technology as shown in FIG. 20B will be described. Here, it is assumed that the dependencies of the processing blocks #1', #2' and #3' are the same as those shown in FIG. 19 described above. Specifically, there is a data dependency of the processing block #1' on the processing block #2' at the same iteration, and similarly, there is a data dependency of the processing block #2' on the processing block #3' at the same iteration. In addition, there is a dependency of the processing block #3' on the processing block #2' at the next iteration.

When the rollback is used, the processing blocks #1 to #3 can be executed after the data to be changed in the processing block #$2_x$ of FIG. 19 are saved in a memory. Thus, it is not necessary to ensure the dependency over iterations as shown by the arrow 20 in FIG. 19, and the data saved in the memory are read when the loop is terminated. Therefore, as compared to the processing according to the embodiment as described above referring to FIG. 20A, the processing block #$2_x$ can proceed the process without waiting for execution of the processing block #$3_{x-1}$ in the processing according to the conventional technology shown in FIG. 20B.

Furthermore, according to the conventional technology, after the loop is terminated in the processing block #$3_2$', the data saved in the memory are read by the process shown as the processing block #$2_R$' in FIG. 219 to ensure the values to be used after termination of the loop. In order to ensure the data, data in the processing blocks #$2_1$' #$2_2$' and #$2_3$' that are hatched in FIG. 21B need to be saved in the memory. The processing block #$2_R$' need to call the data in the processing block #$2_2$' at the second iteration at which the loop is terminated among the data stored in the memory. In the embodiment, in contrast, a program including a loop whose number of iterations is unknown before being executed can be parallelized without reserving an extra memory area for parallelization. Therefore, the embodiment can reduce the required memory area as compared to the method according to the conventional technology shown in FIG. 20B.

When the rollback is used, an extra memory area is required and saving and reading data in/from the memory is required as described above. Therefore, overhead is produced, and the processing time is likely to be longer as compared to the embodiment. In the example of FIG. 20B, data need to be saved at each iteration, which makes the overhead larger as compared to the embodiment.

There have therefore been proposed a method of saving data at every predetermined number of iterations such as at every ten iterations executed to reduce the data amount to be saved as presented in a comparative example. In saving data in the comparative example, data of only the last two iterations are saved, which allows the data amount to be saved to be further reduced. In such case, data at ten iterations before and at twenty iterations before are saved at a point where data are to be saved, for example.

Referring to FIG. 203, this means that the processing block #$1_1$ show execution of the processing block #1 at the first to tenth iterations. Since the other blocks are executed similarly, termination of the loop will be detected in the processing block #$3_1$ in the example of FIG. 203. Thereafter, the result of the loop at the first iteration of the processing blocks #1, #2 and #3, and the result of the loop at the second iteration thereof will be recalculated after reading the data at the initial state before loop execution from the memory. In the embodiment, the previous calculation is completely wasteful. Thus, the overhead may be larger than in the method using the rollback saving data at every predetermined iterations.

As described above, in the conventional technology shown in the comparative example, the problem that the memory is reduced when the rollback is used is reduced. However, the operation of saving data is necessary, and thus the memory area for saving data for the last two iterations is required. Accordingly, it may not be possible to apply this method if the extra memory area available is already not so large for the sequential program before being parallelized.

Figure 21:
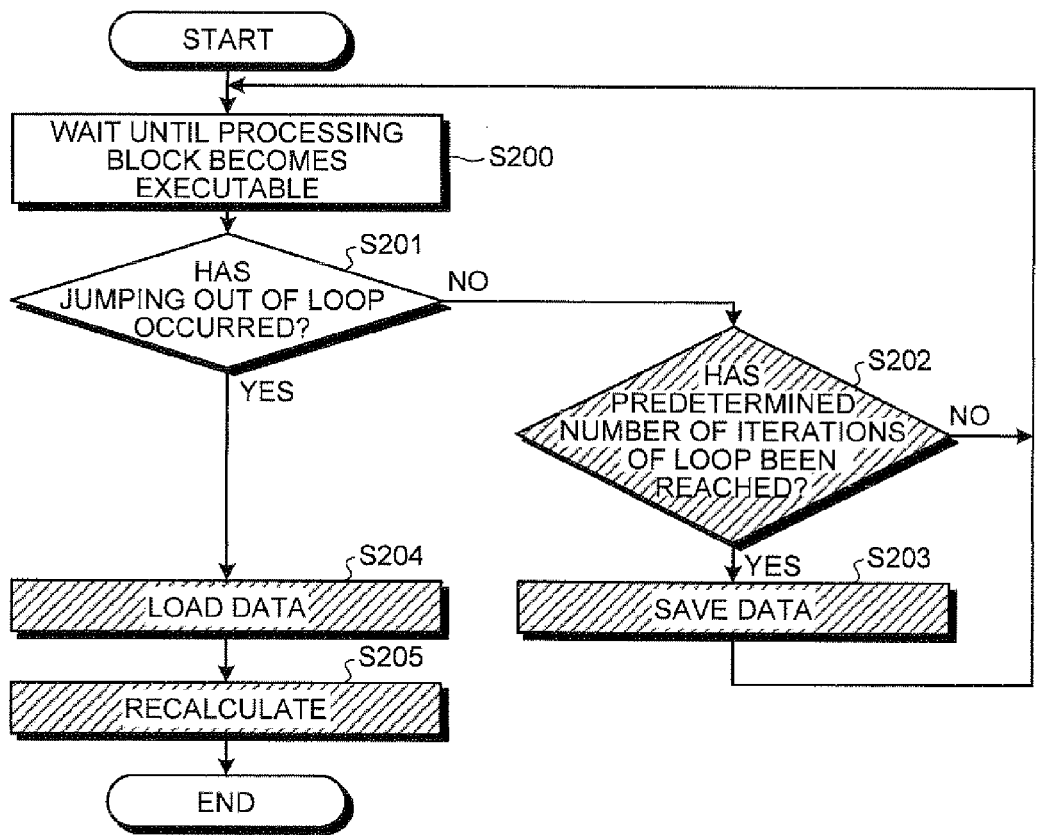
FIG. 21 is a flowchart illustrating an example of control of a parallelized program according to a comparative example.

According to the embodiment, the memory area can be reduced, and at the same time, the control of the parallelized program can be made simpler as compared to the comparative example. FIG. 21 is an example flowchart schematically illustrating a method of controlling a parallelized program according to the comparative example.

In execution of the parallelized program in which a loop is parallelized according to the comparative example, each core executing a thread waits until the processing block to be executed becomes executable (step S200), and when the processing block is executed, determines whether or not jumping from the loop has occurred as a result of the termination process in the processing block (step S201). If it is determined that the termination process by the loop control statement has occurred, each core loads data stored in the memory by the processing block during execution of the program (step S204), performs recalculation using the loaded data (step S205) and terminates the loop.

If it is determined that the termination process of the loop has not occurred in step S201, the processing proceeds to step S202 where each core determines whether a predetermined number of iterations of the loop has been reached. If it is determined that the predetermined number of iterations has not been reached, the processing returns to step S200, where each core executes the process of the next processing block, for example. On the other hand, if it is determined that the predetermined number of iterations has been reached, the processing proceeds to step S203 where each core saves data output in the processing block being executed, and the processing returns to step S200.

In the processes of the flowchart of FIG. 21, the processes in steps S202, S203, S204 and S205 that are hatched are specific to the comparative example, but are not necessary in the embodiment. Thus, in the embodiment, processes such as determining whether or not a predetermined number of iterations of the loop has been reached, saving necessary data, loading the saved data, and recalculation based on the loaded data are reduced, and processes as a whole are simplified as compared to the processes of the comparative example.

In particular, saving necessary data and loading the saved data are processes having a relatively heavy load in the comparative example. Thus, in the comparative example, since all necessary data need to be saved in different regions in the memory area, it may take much time for saving data depending on the size of the data and the architecture. Moreover, since it is also necessary to read correct data among the saved data and to write the read data over appropriate data when loading of data, it requires more time than that required for saving data. Since the processes having a relatively heavy load are omitted in the embodiment, the embodiment is advantageous as compared to the comparative example in terms of improving the speed at which the parallelized program is executed.

Furthermore, in the comparative example, the necessary memory area is reserved by analyzing what data are necessary and how much data amount the data have so as to implement parallelization of a program. However, such analysis is difficult if the necessary data include data for memory access through a pointer, for example, which makes it difficult to implement parallelization. According to the embodiment, since data are not saved for rollback, it is sufficient to determine whether or not data values to be used after termination of a loop is changed at every thread. In addition, since saving of necessary data is not performed, it is not necessary to analyze the data amount, which can simplify the data analyzing process. As a result, the types of loops that can be parallelized are increased as compared to the comparative example.

Figure 22:
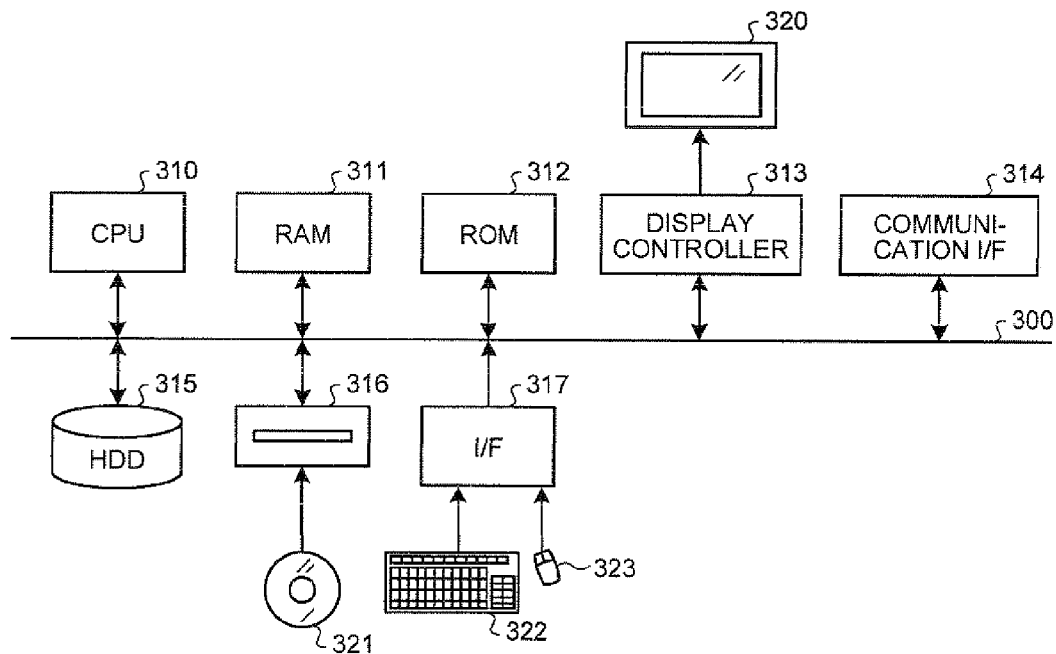
FIG. 22 is a block diagram illustrating a configuration realizing a program parallelization device according to the embodiment.

Next, a configuration by which the program parallelization system according to the embodiment can be implemented is described referring to FIG. 23. As illustrated in FIG. 22, the program parallelization system according to the embodiment can be implemented by a typical computer system, for example.

In FIG. 22, a CPU 310, a random access memory (RAM) 311, a read only memory (ROM) 312, a display controller 313 and a communication interface (I/F) 314 are connected to a bus 300. In addition, a hard disk drive (HDD) 315, a drive 316 and an input I/F 317 are connected to the bus 300.

The CPU 310 controls the entire computer system using the RAM 311 as a working memory according to a program stored in the ROM 312 or the HOD 315. The display controller 313 converts a display control signal generated by the CPU 310 into a signal that can be displayed on a display device 320 and outputs the converted signal.

The HDD 315 stores a program to be executed by the CPU 310 described above, data to be used in the program, and the like. A removable recording medium 321 can be loaded into the drive 316. The drive 316 can read and write data from/to the recording medium 321. Examples of the recording medium 321 that can be supported by the drive 316 includes a disk recording medium such as a compact disk (CD), a digital versatile disk (DVD) and a flexible disk, and a non-volatile semiconductor memory from/to which data can be read and written.

The input I/F 317 inputs data from outside. For example, the input I/F 317 has a given interface such as a universal serial bus (USB) or an IEEE 1394 (Institute of Electrical and Electronics Engineers 1394) interface through which data are input from external devices. In addition, input devices such as a keyboard 322 and a mouse 323 are connected to the input I/F 317. The user can instruct the computer system by operating the input devices according to display on the display device 320, for example.

The communication. I/F 314 communicates with an external communication network using a predetermined protocol.

The program analyzing unit 101, the program parallelizing unit 102 and the program converting unit 103 in the program parallelization system described above are implemented by a program running on the CPU 310. The sequential program 110 and the loop division information 130 are created by another computer system, recorded on the recording medium 321 and supplied to the present computer system, for example. Alternatively, the sequential program 110 and the loop division information 130 may be supplied to the present computer system from outside through a network, or may be input through the keyboard 322. The sequential program 110 and the loop division information 130 supplied to the present computer system are stored in the HOD 315 or the RAM 311, for example.

A program for implementing the program parallelization system according to the embodiment is provided in a manner recorded on a computer readable recording medium such as a CD-ROM, a flexible disk or a DVD in a form of a file that can be installed or executed. Alternatively, a program for implementing the program parallelization system may be provided in a manner stored in the ROM 312 in advance.

Still alternatively, a program for implementing the program parallelization system according to the embodiment may be provided in a manner stored in a computer system connected to a network such as the Internet and downloaded through the network. Furthermore, a program for implementing the program parallelization system according to the embodiment may be provided or distributed through a network such as the Internet.

A program for implementing the program parallelization system according to the embodiment has a modular structure including the respective units described above (the program analyzing unit 101, the program parallelizing unit 102 and the program converting unit 103). In an actual hardware configuration, the CPU 310 reads the program from the HOD 315, for example, and executes the program, whereby the respective units described above are loaded on the RAM 311 and generated on the RAM 311.

As an example, the CPU 310 analyzes the sequential program 110 based on the sequential program 110 and the loop division information 130 read from the HDD 315 or the RAM 311 by means of the program analyzing unit 101 and outputs the loop control information 120, the change information 121 and the data dependency information 122. The loop control information 120, the change information 121 and the data dependency information 122 are passed to the program parallelizing unit 102 via the HOD 315 or the RAM 311. The CPU 310 outputs the intermediate parallelized program 131 based on the loop control information 120 and the change information 121 as well as the sequential program 110 and the loop division information 130 read from the HDD 315 or the RAM 311 by means of the program parallelizing unit 102. The intermediate parallelized program 131 is passed to the program converting unit 103 via the HDD 315 or the RAM 311. The CPU 310 generates the parallelized program 140 based on the intermediate parallelized program 131 and the data dependency information 122 read from the HDD 315 and the RAM 311 by means of the program converting unit 103. The generated parallelized program 140 is output to outside in a manner recorded on the recording medium 321 by the drive 316 or sent to a network through the communication I/F 314, for example.

While it has been described above that the program analyzing unit 101, the program parallelizing unit 102 and the program converting unit 103 operate in one computer system, the operation thereof is not limited thereto. For example, one or more of the program analyzing unit 101, the program parallelizing unit 102 and the program converting unit 103 may operate in different computer systems from one another. In this case, the loop control information 120, the change information 121 and the data dependency information 122 are supplied to the program parallelizing unit 102 and the program converting unit 103 via the recording medium 321 or a network. Similarly, the intermediate parallelized program 131 is supplied to the program converting unit 103 via the recording medium 321 or a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A program product including a non-transitory computer readable medium including programmed instructions, wherein the instructions, when executed by a computer, comprise instructions for causing the computer to perform:

inputting a sequential program to be converted that includes a loop, loop division information indicating that a process within the loop is to be divided into a first process and a second process, loop control information comprising termination control information and indicating that at least one of the first process and the second process includes a loop control statement of the loop, and change information indicating that at least one of the first process and the second process executes a change process that changes data to be referred to in a process subsequent to the loop; and parallelizing, in which the loop is divided into the first process and the second process according to the loop division information and a parallelized program is created, which is to run on a computer including a plurality of cores or processors or on a plurality of computers, from the first process and the second process obtained by dividing the loop, wherein the loop control information indicates that the first process includes the loop control statement, and the change information indicates that the second process includes the change process, the parallelizing inserts a determination process into the first process, the determination process determining whether or not the second process is terminated at execution of an (n−1)th loop iteration (n is an integer of 2 or more) when the second process is subsequent to the first process in the program to be converted, or determining whether or not the second process is terminated at execution of an nth loop iteration when the second process precedes the first process in the program to be converted, and notifying the second process of a result of the determination, and the parallelizing inserts a control process into the second process, the control process controlling execution of the second process based on the result of determination notified by the determination process.

2. A program parallelization device, comprising:

an input unit configured to input a sequential program to be converted that includes a loop, loop division information indicating that a process within the loop is to be divided into a first process and a second process, loop control information comprising termination control information and indicating that at least one of the first process and the second process includes a loop control statement of the loop, and change information indicating that at least one of the first process and the second process executes a change statement that changes data to be referred to in a process subsequent to the loop;

a loop parallelizing unit configured to divide the loop into the first process and the second process according to the loop division information and create a parallelized program, which is to run on a computer including a plurality of cores or processors or on a plurality of computers, from the first process and the second process obtained by dividing the loop; and a processor for executing at least the loop parallelizing unit, wherein the loop control information indicates that the first process includes the loop control statement, and the change information indicates that the second process includes the change statement, the loop parallelizing unit inserts a determination process into the first process, the determination process determining whether or not the second process is terminated at execution of an (n−1)th loop iteration (n is an integer of 2 or more) when the second process is subsequent to the first process in the program to be converted, or determining whether or not the second process is terminated at execution of an nth loop iteration when the second process precedes the first process in the program to be converted, and notifying the second process of a result of the determination, and the loop parallelizing unit inserts a control process into the second process, the control process controlling execution of the second process based on the result of determination notified by the determination process.

3. The device according to claim 2, wherein the loop division information indicates that the loop is to be divided into the first process, the second process and a third process that handles only data referred to within the loop, the loop parallelizing unit inserts a second determination process into the first process, the second determination process ensuring execution up to the (n−1)th iteration of the third process and determining whether or not to terminate a process of execution subsequent to the (n−1)th iteration when the third process is subsequent to the first process in the program to be converted, or ensuring execution at least up to the nth iteration of the third process and determining whether or not to terminate a process of execution subsequent to the nth iteration, and notifying the third process of a result of the determination of the second determination process, and the loop parallelizing unit inserts a second control process, into the third process, the second control process controlling execution of the third process based on the result of determination notified by the second determination process.

4. The device according to claim 2, wherein when a loop control statement of the loop is not executed within the loop, the loop parallelizing unit converts the loop into a loop into which a conditional statement for executing a loop control statement of the loop is inserted and which exits when a condition according to the conditional statement is met.

5. The device according to claim 4, wherein
when the conditional statement of the loop includes the loop control statement of the loop,
the loop parallelizing unit converts the loop into a loop in which a conditional statement for executing the loop control statement of the loop is contained and the number of iterations is not defined.

6. The device according to claim 4, wherein
when an exception handling including the entire loop is set,
the loop parallelizing unit converts the loop into a loop in which a syntax for detecting an exception is set for a process within the loop where an exception may occur and which exits when an exception is detected by the syntax.

7. The device according to claim 2, wherein
the loop control information includes at least one of:
first loop control information indicating terminating a loop when a condition is met in the first process;
second loop control information indicating terminating a function including a loop when a condition is met in the first process;
third loop control information indicating resuming a process from a specified part outside of a loop when a condition is met in the first process; and
fourth loop control information indicating terminating a process at an m-th loop iteration (m is an integer of 1 or more) at which a condition is met in the first process and executing a process at an (m+1)th loop iteration.

8. The device according to claim 2, wherein
the loop parallelizing unit outputs a program having a data structure including first data indicating that a condition to execute the loop control statement is met in the first process and second data indicating the number of iterations of the first process including the loop control statement, and
the parallelized program created by the loop parallelizing unit notifies all threads of whether a loop is terminated and the number of iterations using the data structure.

* * * * *